US012184140B2

(12) United States Patent
Hatch et al.

(10) Patent No.: US 12,184,140 B2
(45) Date of Patent: Dec. 31, 2024

(54) MOTOR, FLAT-WIRE MOTOR WINDING, COIL WINDING ASSEMBLY, AND WINDING METHOD

(71) Applicant: Linear Labs, LLC, Granbury, TX (US)

(72) Inventors: Erik Hatch, Granbury, TX (US); John Langsdorf, Granbury, TX (US); Cosmin Gheorghe Barbu, Granbury, TX (US)

(73) Assignee: Linear Labs, Inc., Granbury, TX (US)

( * ) Notice: Subject to any disclaimer, the term of this patent is extended or adjusted under 35 U.S.C. 154(b) by 135 days.

(21) Appl. No.: 18/086,547

(22) Filed: Dec. 21, 2022

(65) Prior Publication Data

US 2023/0208229 A1 Jun. 29, 2023

Related U.S. Application Data

(63) Continuation-in-part of application No. 17/412,117, filed on Aug. 25, 2021, now abandoned.

(60) Provisional application No. 63/292,064, filed on Dec. 21, 2021, provisional application No. 63/122,364, filed on Dec. 7, 2020.

(51) Int. Cl.
*H02K 1/16* (2006.01)
*H02K 3/12* (2006.01)
*H02K 15/08* (2006.01)

(52) U.S. Cl.
CPC ............. *H02K 3/12* (2013.01); *H02K 1/16* (2013.01); *H02K 15/08* (2013.01)

(58) Field of Classification Search
CPC ...... H02K 21/14; H02K 1/02; H02K 3/28; H02K 1/30; H02K 1/14; H02K 21/12; H02K 3/12; H02K 15/08; H02K 1/27; H02K 1/276; H02K 1/18; H02K 1/146; H02K 15/0062; H02K 11/30; H02K 21/145; H02K 15/095; H02K 3/522; H02K 11/33; H02K 16/02; H02K 3/47
See application file for complete search history.

(56) References Cited

U.S. PATENT DOCUMENTS

| | | | |
|---|---|---|---|
| 2004/0021391 A1* | 2/2004 | Jones | H02K 3/04 310/184 |
| 2022/0094228 A1* | 3/2022 | Lines | H02K 1/182 |

* cited by examiner

*Primary Examiner* — Leda T Pham
(74) *Attorney, Agent, or Firm* — Run8 Patent Group, LLC; Peter Miller

(57) ABSTRACT

A motor winding includes a wire defining a rectangular cross-section and wound in a continuous direction about a coil axis to form a continuous coil including: a first coil segment spiraling in a first plane, defining a first external terminal, and defining a first interior end inset from the first external terminal and arranged on a first side of a coil axis; a second coil segment spiraling in a second plane parallel and offset from the first plane, defining a second exterior terminal parallel to the first external terminal, and defining a second interior end inset from the second exterior coil end and arranged on a second side of the coil axis opposite the first interior end; and a junction extending between the first plane and the second plane to couple the first interior end of the first coil segment to the second interior end of the second coil segment.

20 Claims, 21 Drawing Sheets

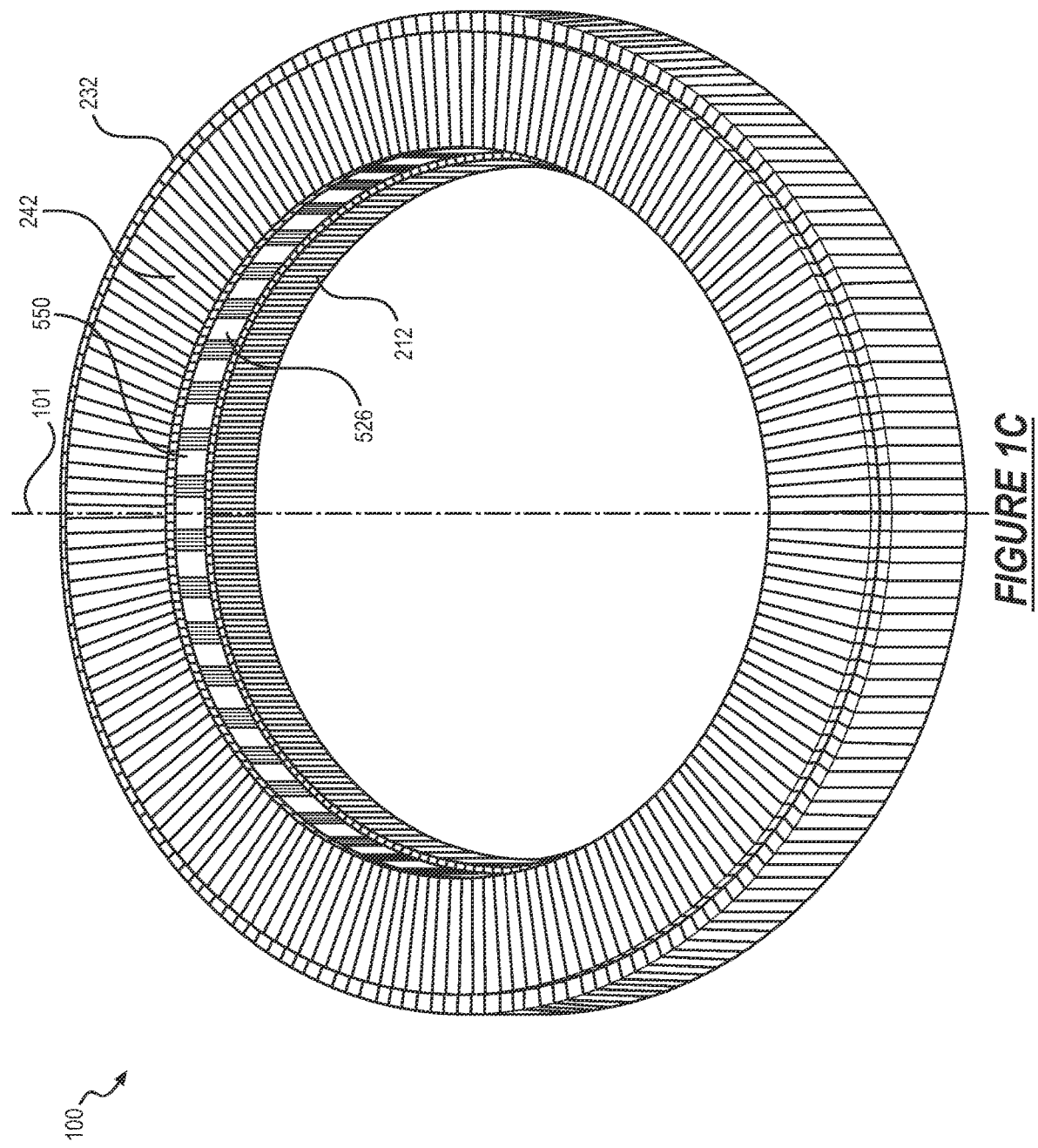

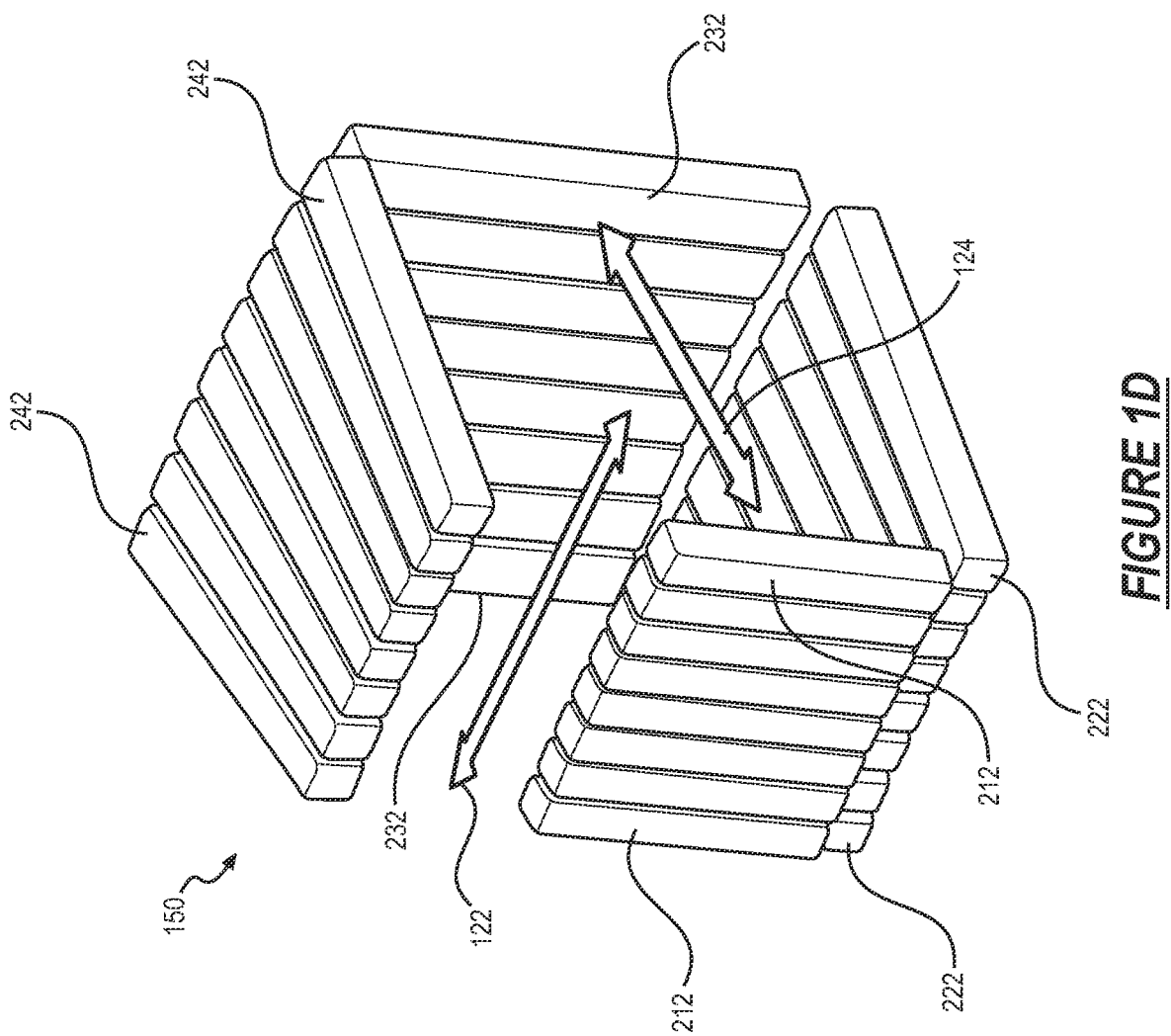

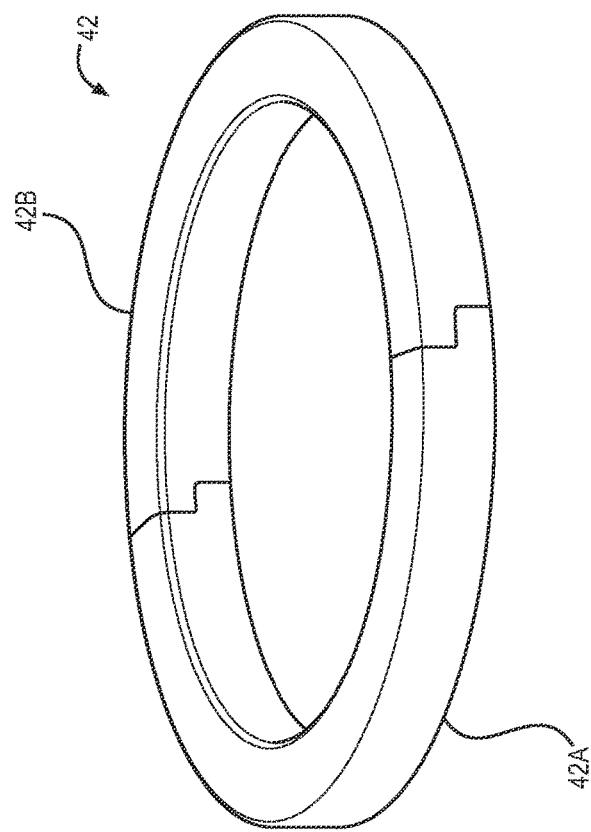
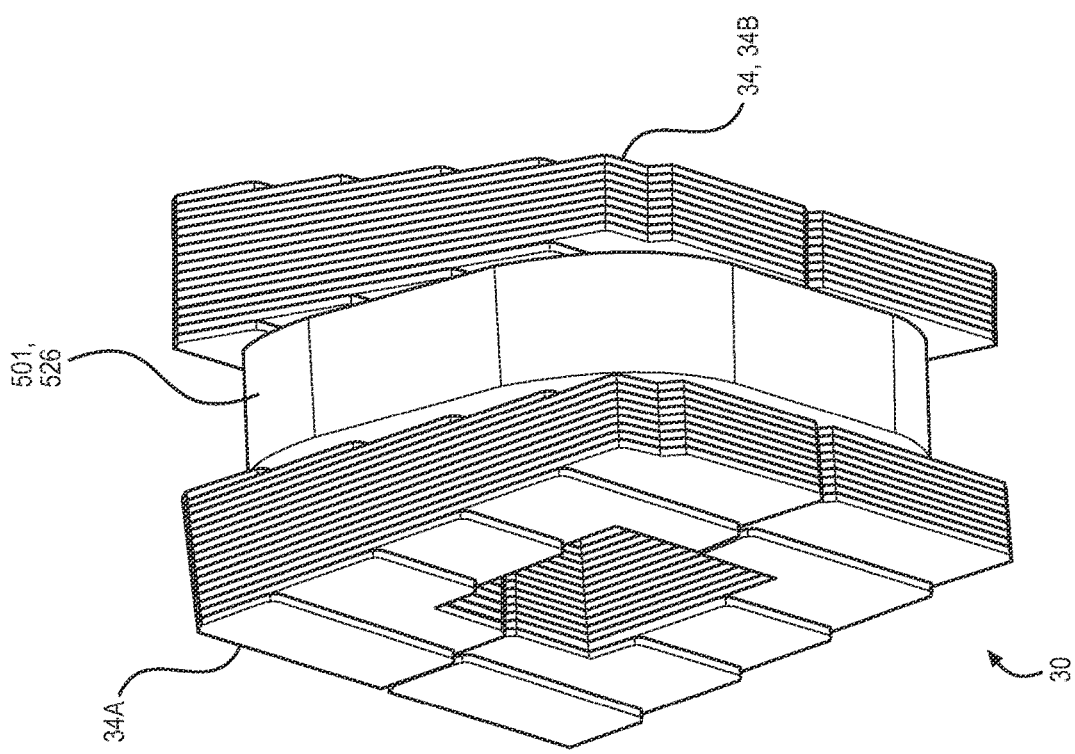

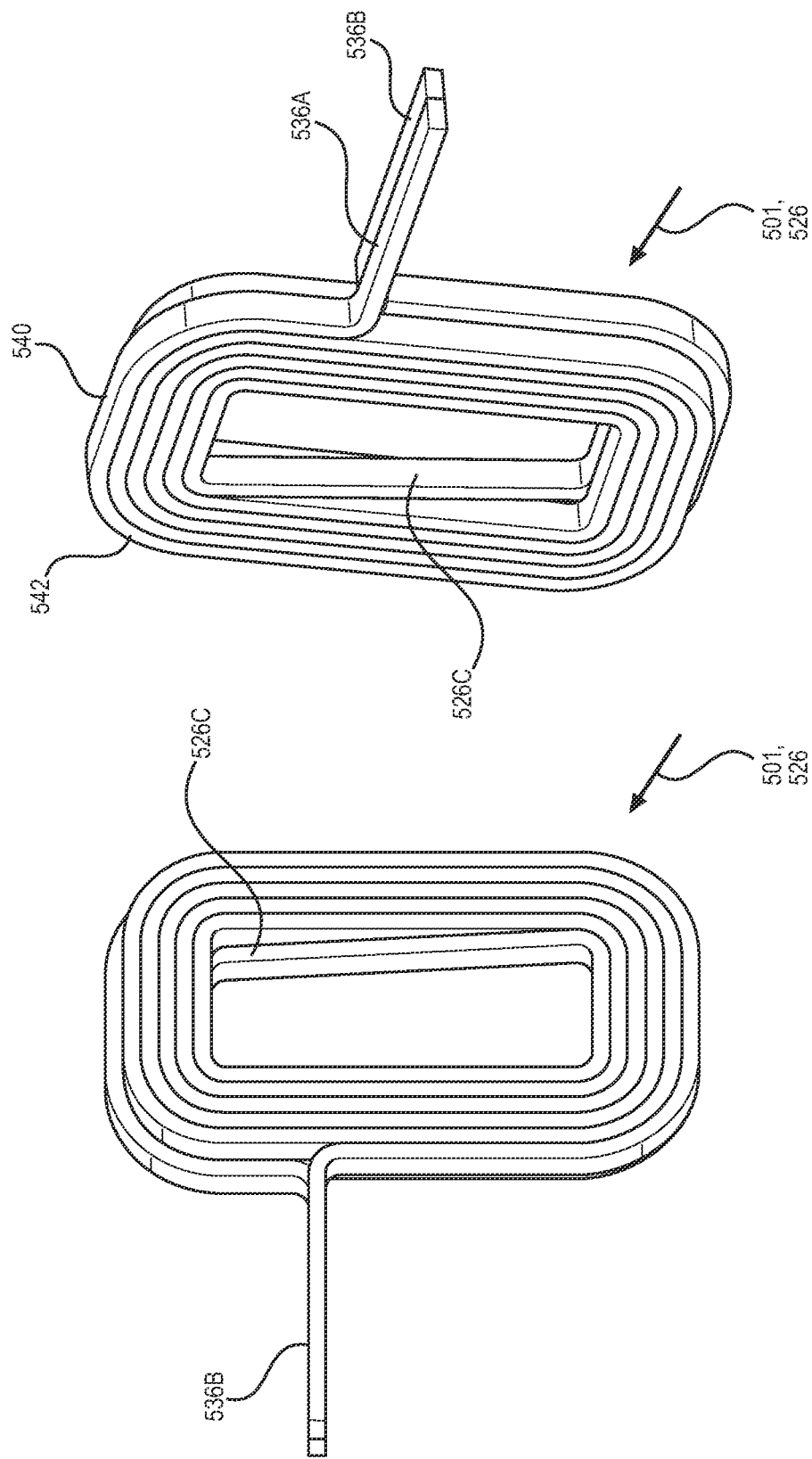

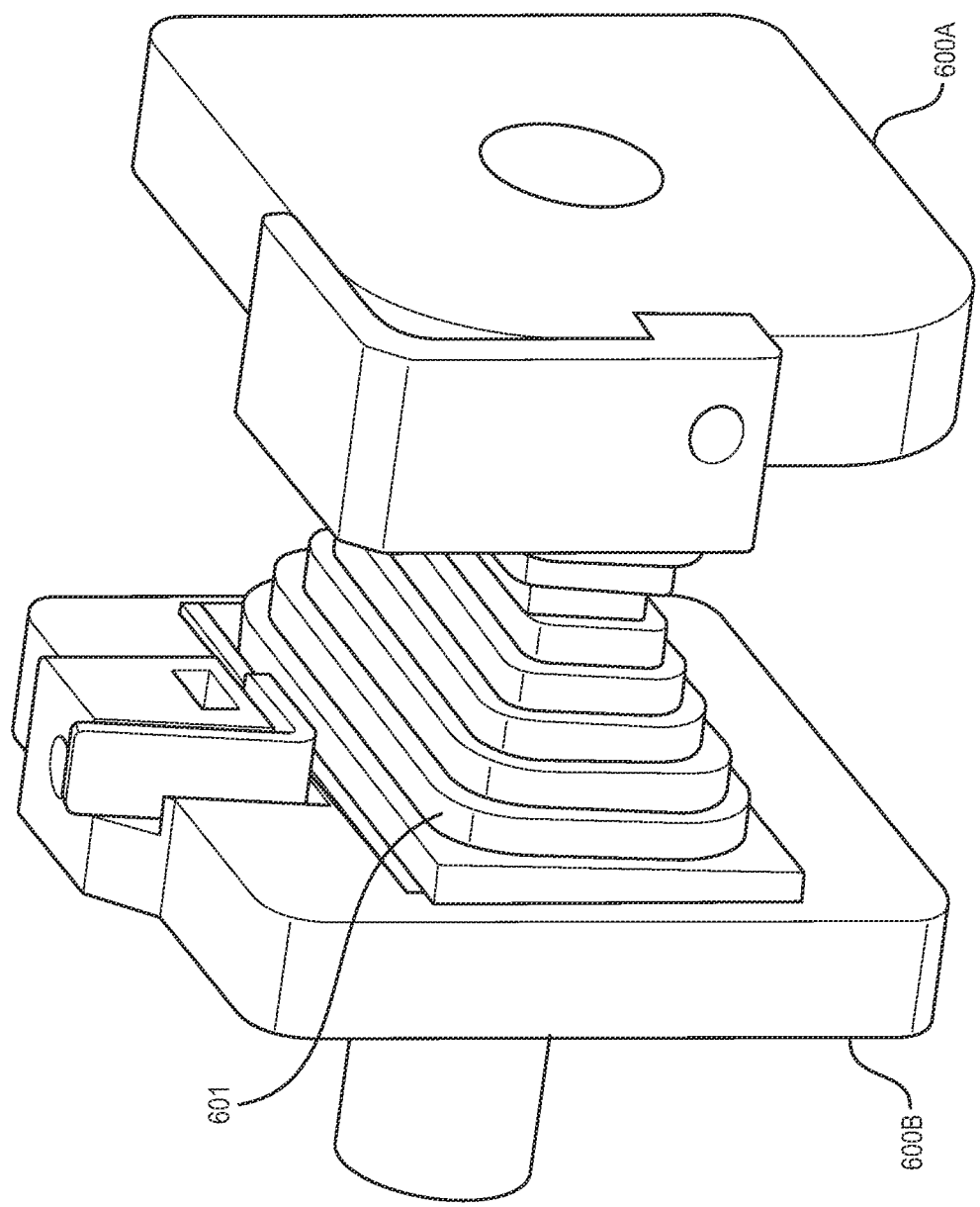

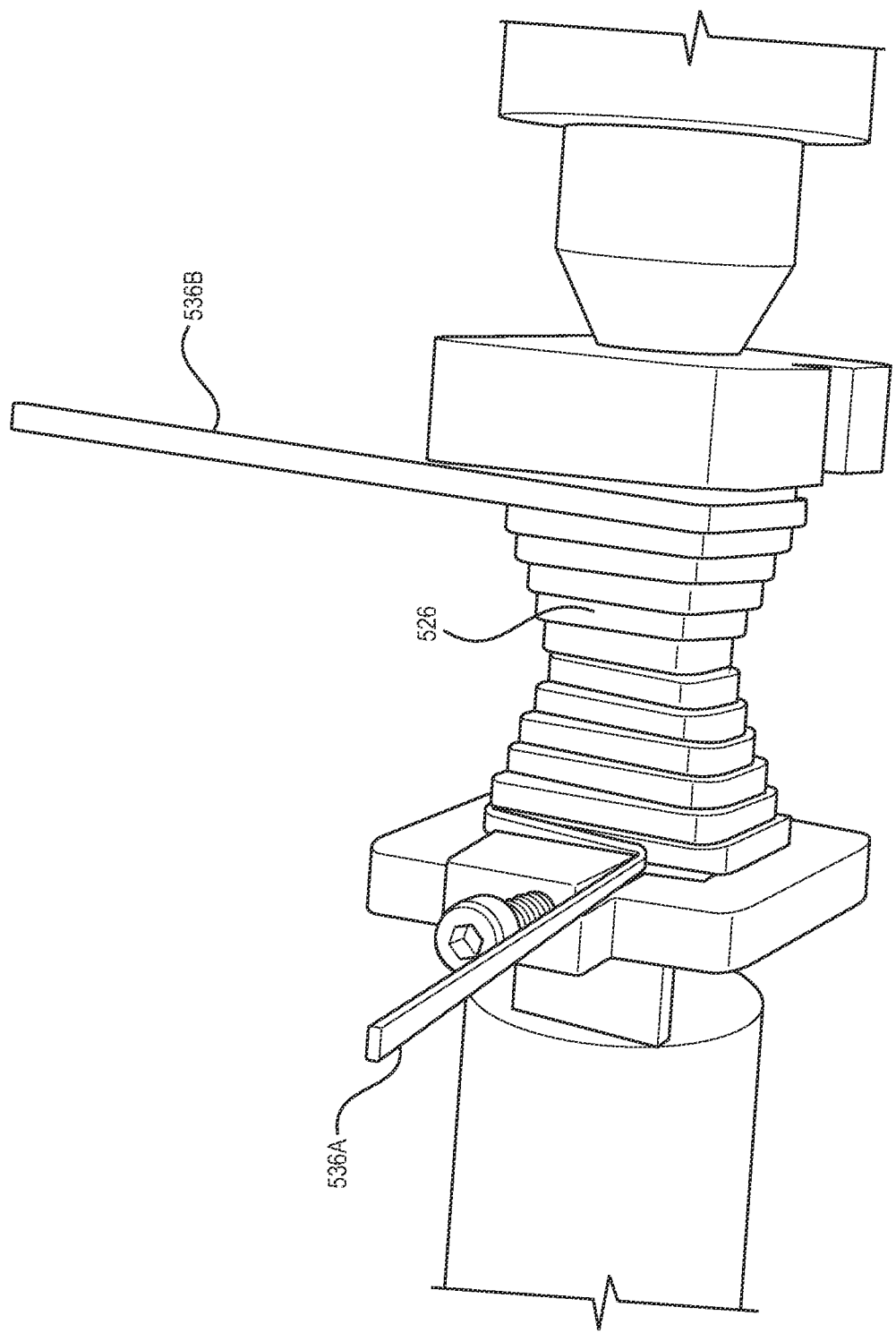

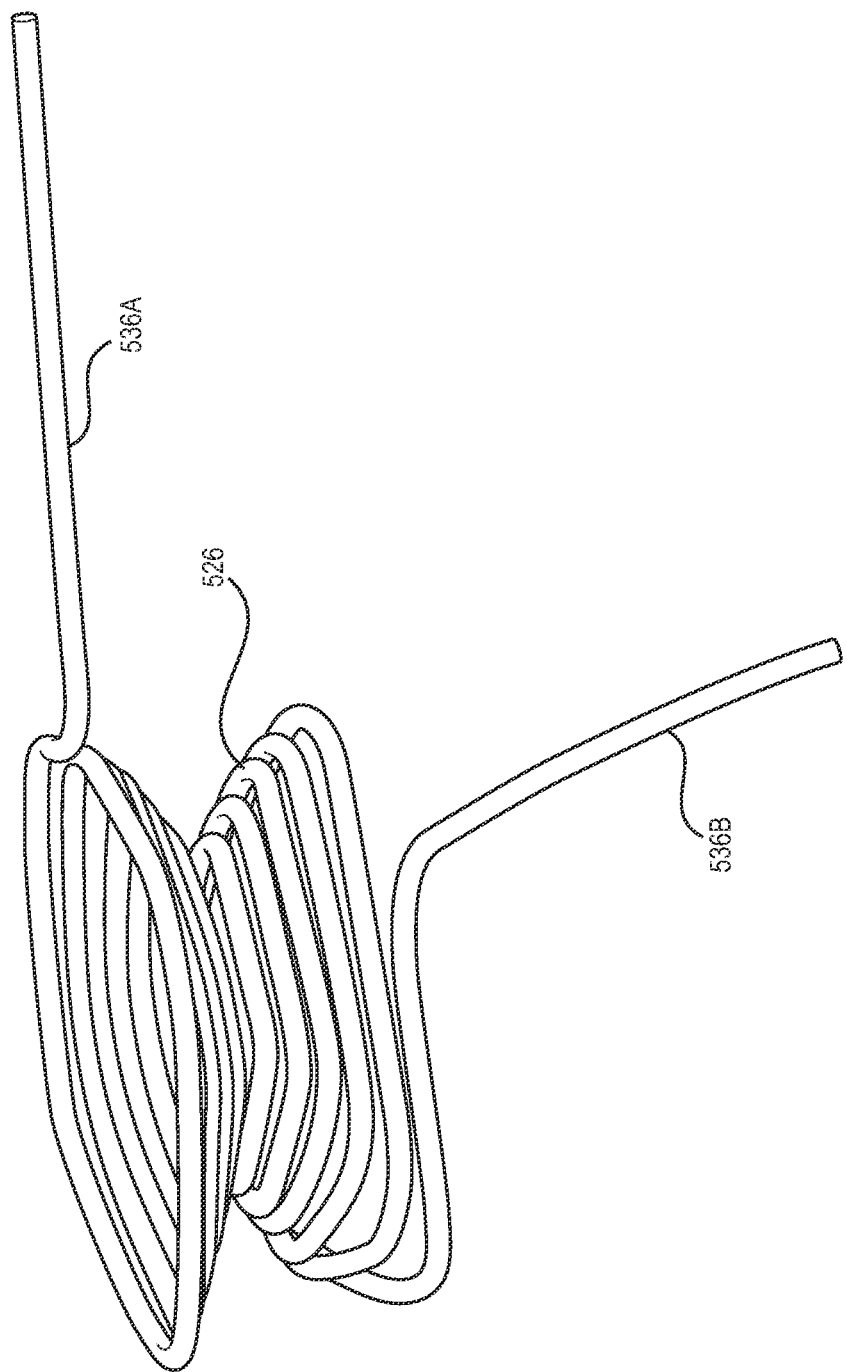

MOTOR, FLAT-WIRE MOTOR WINDING, COIL WINDING ASSEMBLY, AND WINDING METHOD

CROSS-REFERENCE TO RELATED APPLICATIONS

This Application claims priority to U.S. Provisional Patent Application No. 63/292,064 filed on 21 Dec. 2021, which is incorporated in its entirety by this reference.

TECHNICAL FIELD

The invention relates generally to the field of electric machines and more specifically to a motor, flat-wire motor winding, coil winding assembly, and winding method in the field of electric machines.

BRIEF DESCRIPTION OF THE FIGURES

FIG. 1C is an isometric view of one variation of a magnetic toroidal cylinder of the motor.

FIG. 1D is an isometric view illustrating a single Halbach array torque tunnel segment of the magnetic toroidal cylinder of the motor.

FIG. 1E is an isometric view of a coil situated between a pair of stator poles in the coil winding assembly.

FIG. 1F is an isometric view of one variation of an annual core of the coil winding assembly.

FIG. 2A is a right-side view of a continuous coil wound in a first (clockwise) direction according to a method.

FIG. 2B is a left isometric view of one variation of the continuous coil wound in the first direction.

FIG. 6B is an isometric view of the mandrel assembly.

FIG. 7A is an illustrated view of the continuous coil wound on the mandrel assembly according to the method.

FIGS. 7B, 7C, 7D, 7E, and 7F are illustrated views of the continuous coil in the relaxed configuration.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Motor Winding

As shown in FIGS. 1A, 1E, 1F, 2A, and 2B, a motor winding 501 includes a wire: defining a wire width along a primary wire axis; defining a wire thickness along a secondary wire axis, the wire thickness less than the wire width; and wound in a continuous angular direction about a coil axis to form a continuous coil 526.

The continuous coil 526 includes: a first terminal 536A; a second terminal 536B adjacent the first terminal 536A; a first coil segment 526A; a second coil segment 526B; and a junction segment 526C.

The first coil segment 526A: includes a first length of the wire spiraling in a first plane parallel to the secondary wire axis and perpendicular to the primary wire axis of the first length of the wire; defines a first exterior coil end coupled to the first terminal 536A; and defines a first interior coil end inset from the first exterior coil end and arranged on a first side of the coil axis.

The second coil segment 526B: includes a second length of the wire spiraling in a second plane parallel to the secondary wire axis and perpendicular to the primary wire axis of the second length of the wire, the second plane parallel and offset from the first plane; defines a second exterior coil end coupled to the second terminal 536B; and defines a second interior coil end inset from the second exterior coil end and arranged on a second side of the coil axis opposite the first interior coil end.

The junction segment 526C includes a third length of the wire extending between the first plane and the second plane to couple the first interior coil end of the first coil segment 526A to the second interior coil end of the second coil segment 526B.

Figure 1A:
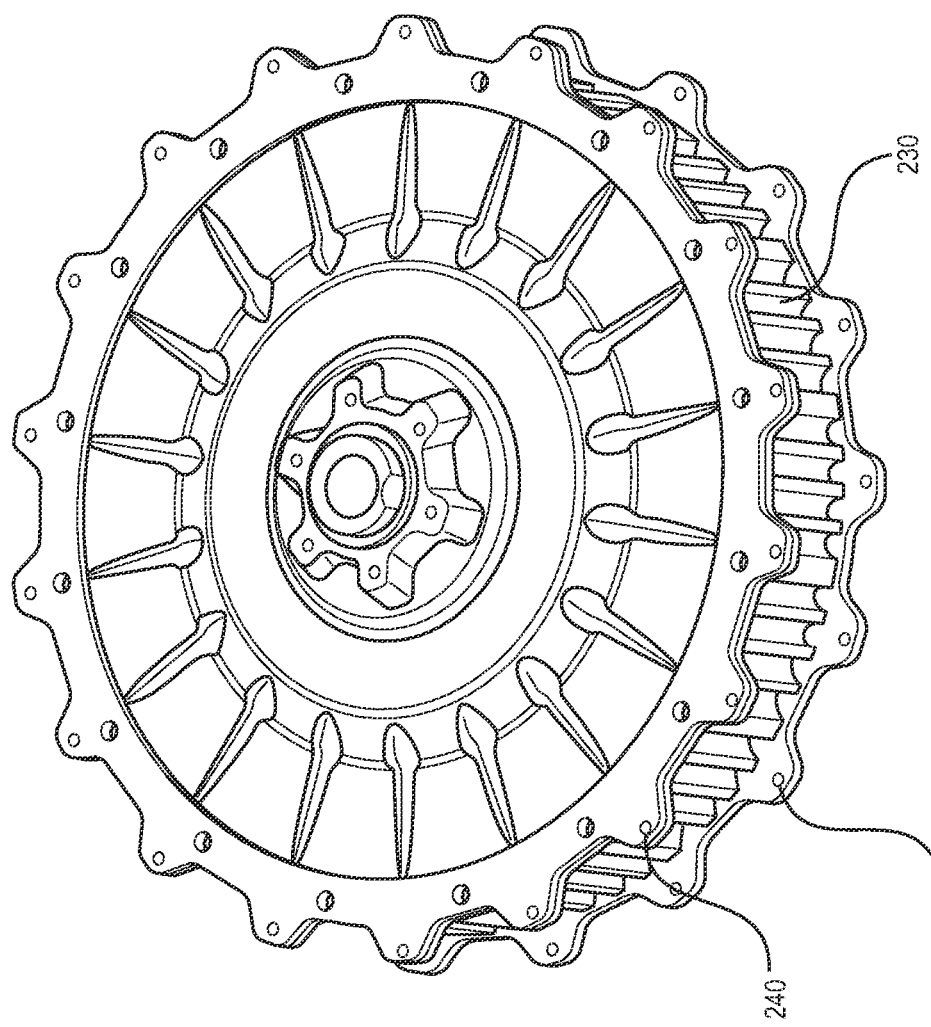
FIG. 1A is an isometric view of a motor integrating a continuous coil and a coil winding assembly.
Figure 1B:
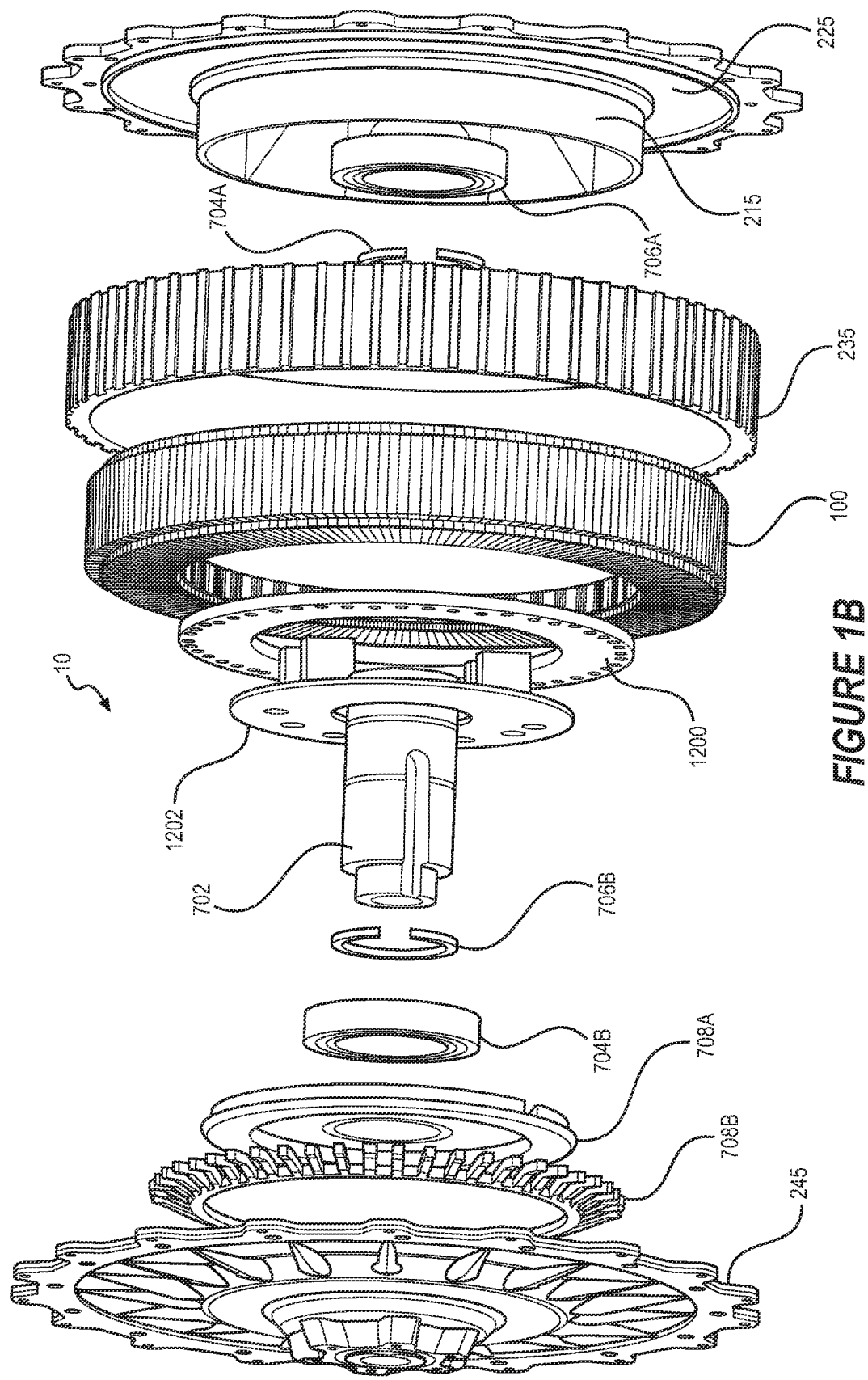
FIG. 1B is an exploded view of one variation of the motor.
Figure 1G:
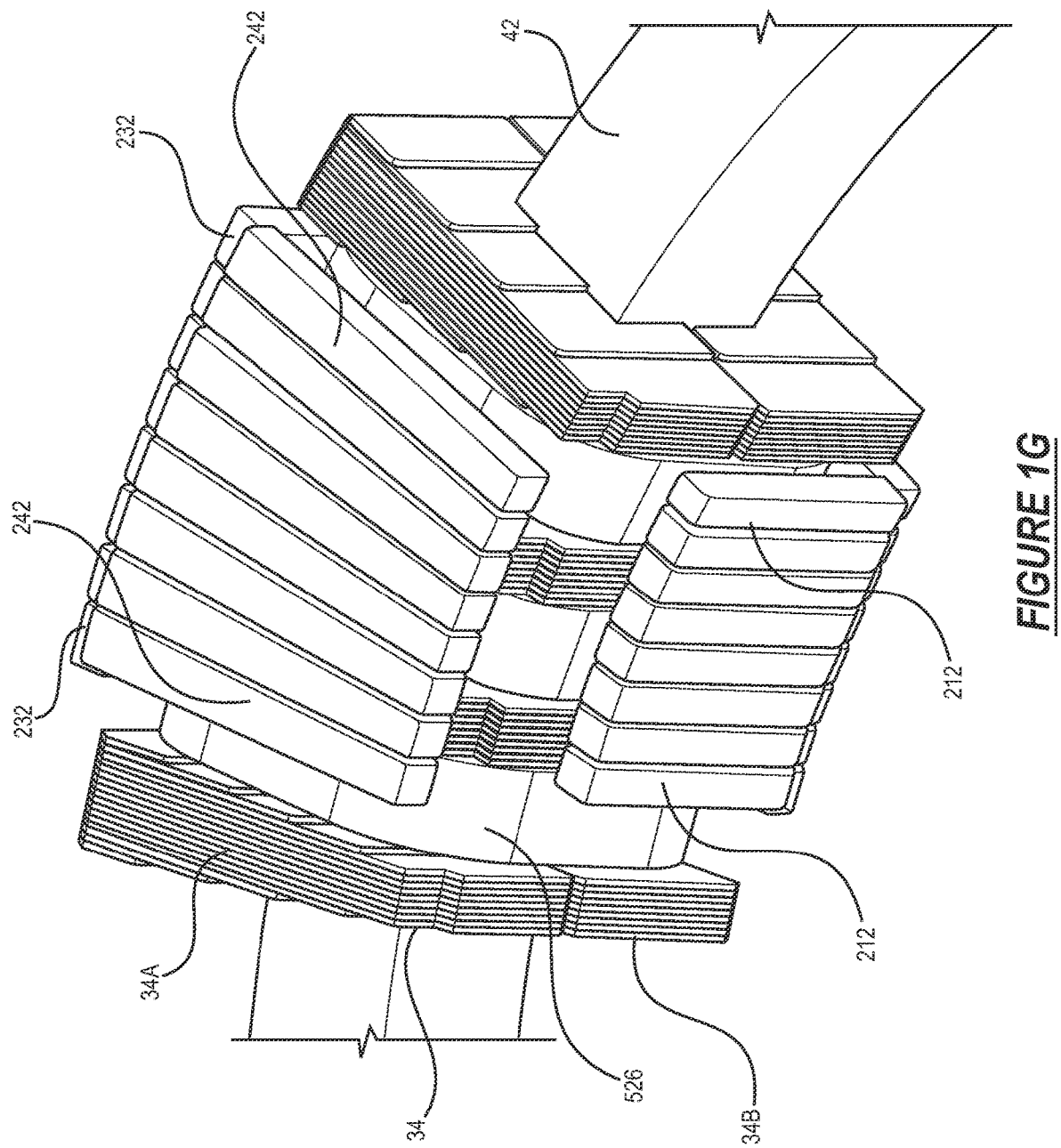
FIG. 1G is an isometric view of the single Halbach array torque tunnel segment of the magnetic toroidal cylinder, stator poles, and continuous coils of the coil winding assembly.
Figure 1H:
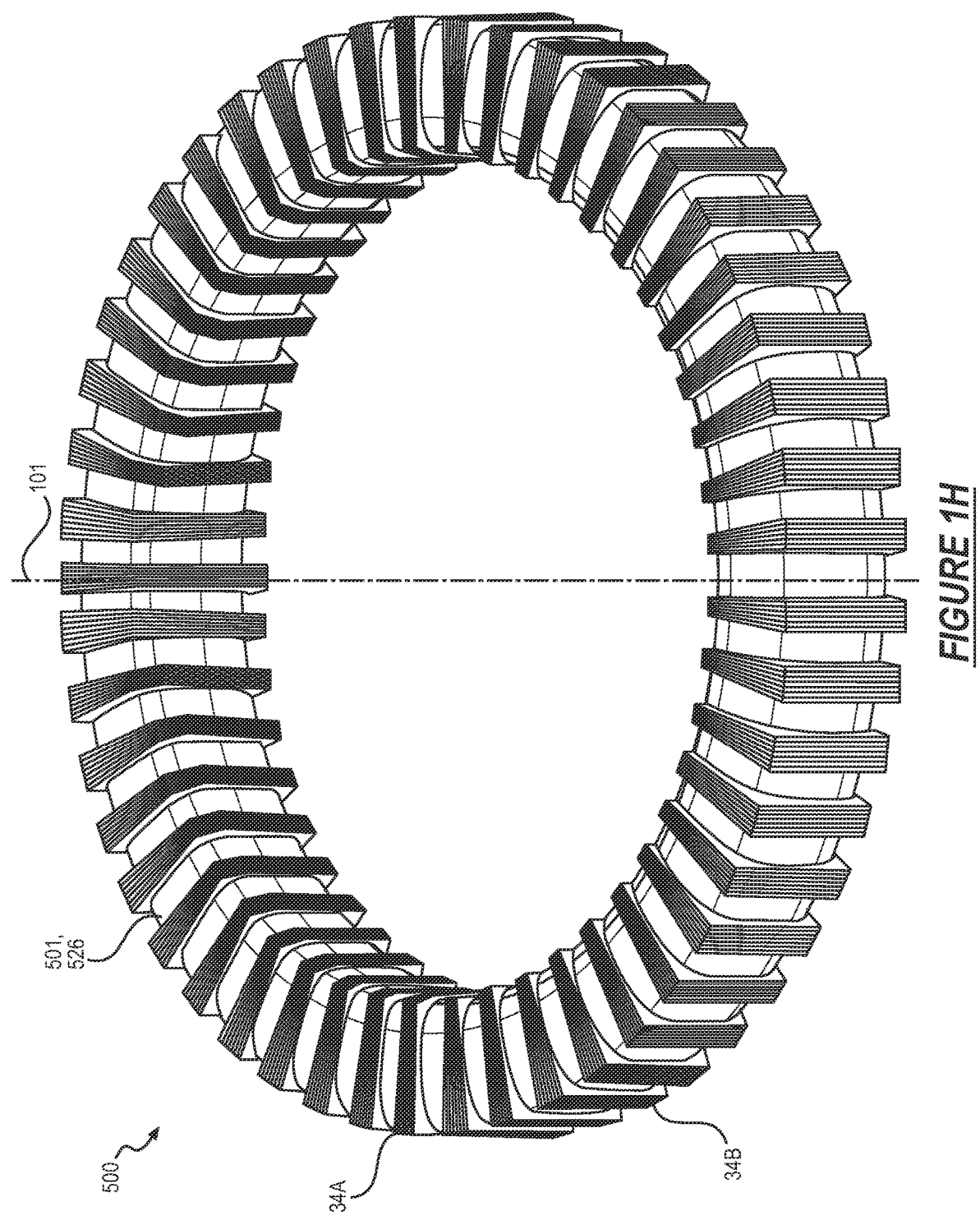
FIG. 1H is an isometric of the coil winding assembly.

In one variation shown in FIGS. 1B, 1G, and 1H, a coil winding assembly 500 of a motor 10 includes: an annual core 42 defining a motor axis; a first continuous coil 526 arranged on the annual core 42; a second coil section arranged on the annual core 42 and radially offset from the first continuous coil 526; and a stator pole 34 arranged on the annual core 42 and interposed between the first continuous coil 526 and the second continuous coil 526.

1.1 Applications

Generally, the motor winding 501 includes a single, continuous, solid-core wire wound in a single continuous direction to form a spatially-efficient, continuous, two-row, multi-turn, inductor defining rectangular inner and outer cross sections.

Figure 3A:
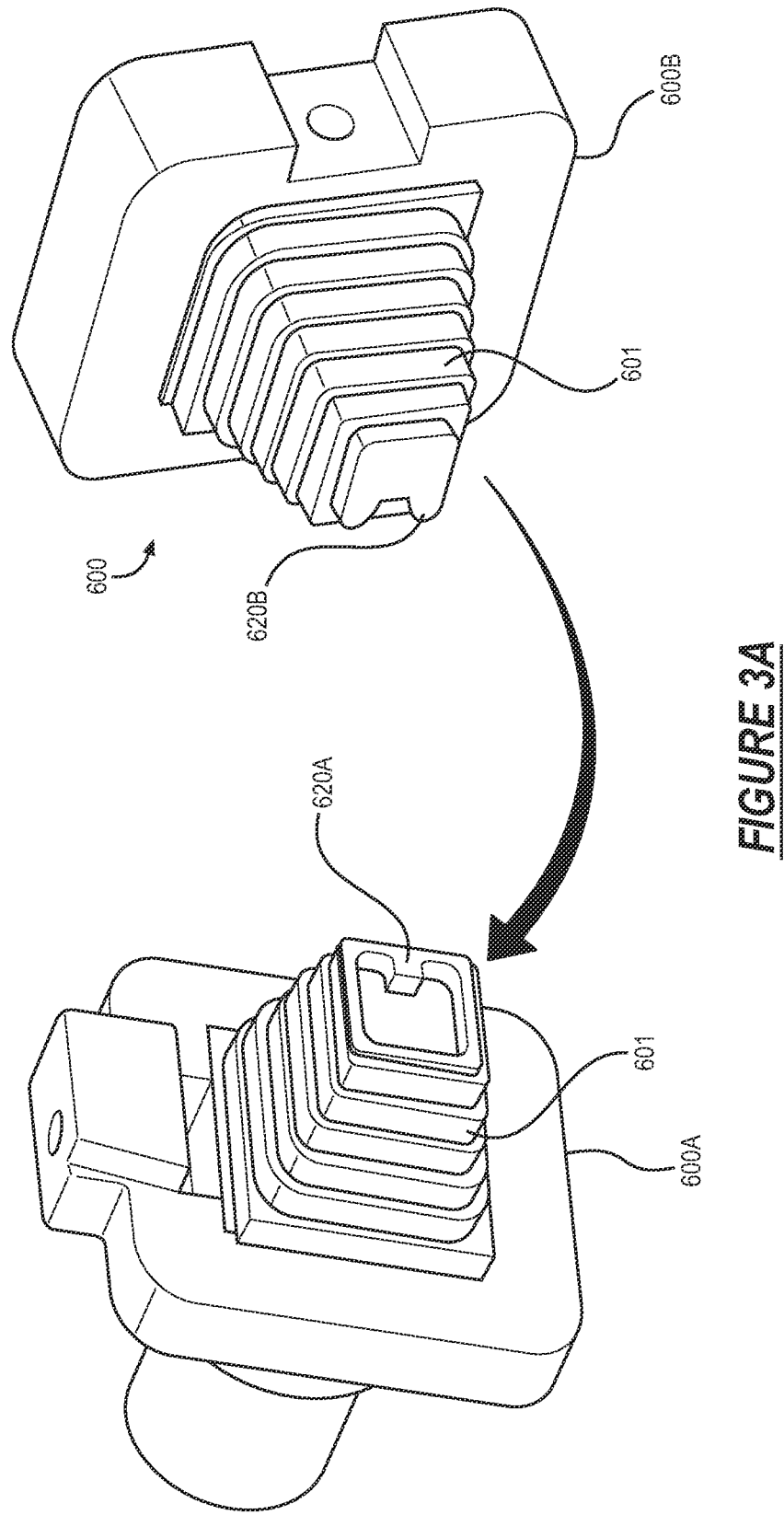
FIG. 3A is an isometric view of a first mandrel form and a second mandrel form of a mandrel assembly.
Figure 3B:
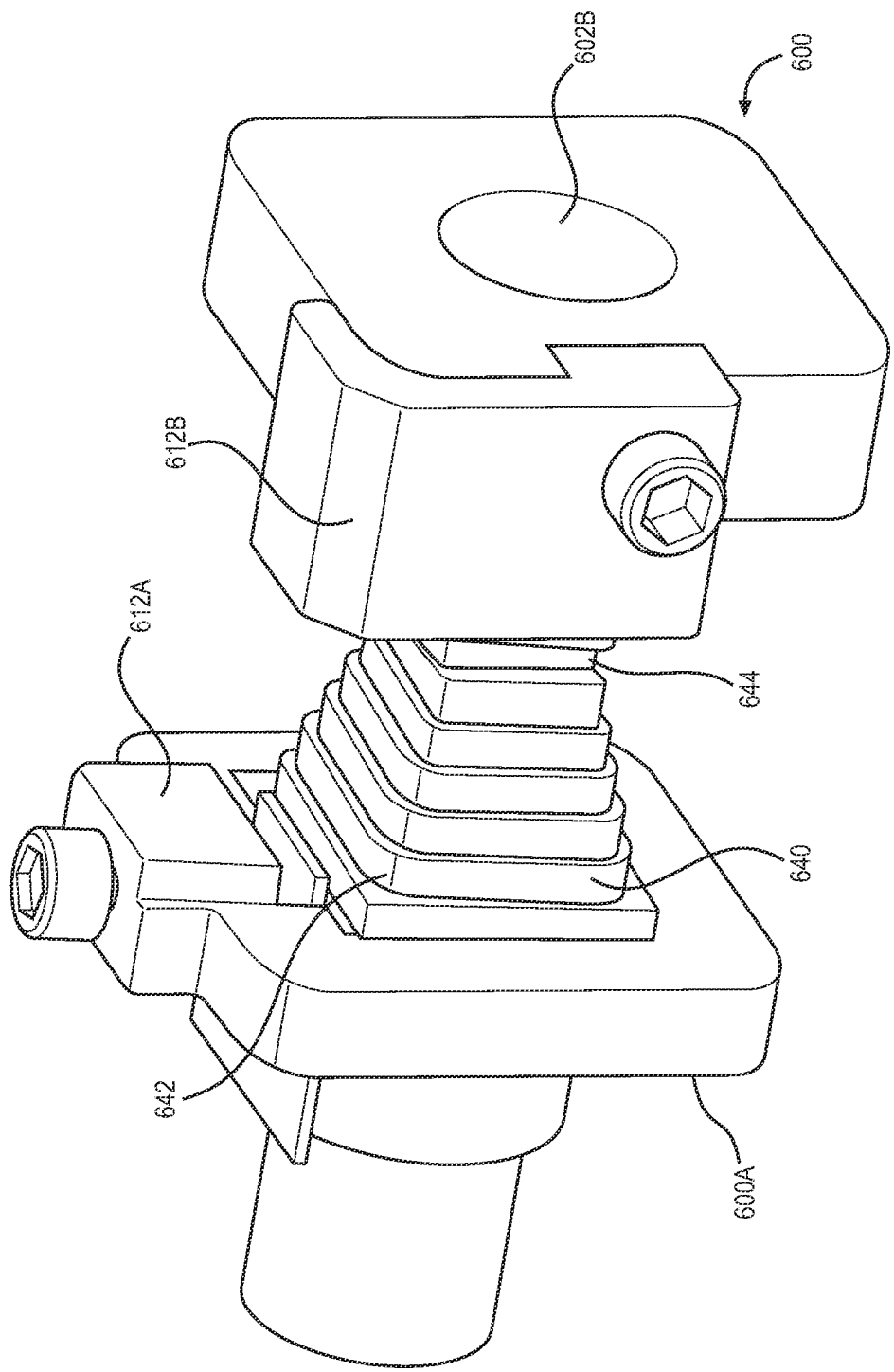
FIG. 3B is an isometric view of the mandrel assembly for the continuous coil wound in the first direction.

In particular, the single, continuous, solid-core wire is wound on a mandrel assembly 600 that defines: a first rectangular helical ramp that spirals inwardly in a first direction; and a second rectangular helical ramp that spirals outwardly in the first direction, as shown in FIGS. 3A and 3B. Once the wire is removed from the mandrel assembly 600, the resulting continuous coil 526 includes: a first series of nested linear sections 540 interposed between a first series of nested arcuate sections 542 that cooperate to form a first coil segment 526A defining a first row of coil turns; a second series of nested linear sections 540 interposed between a second series of nested arcuate sections 542 that cooperate to form a second coil segment 526B defining a second row of coil turns; a junction segment 526C that connects the first and second coil segments 526A, 526B; and a first terminal 536A and a second terminal 536B extending from the first and second coil segments 526A, 526B and configured to mount, locate, and electrically couple the mandrel assembly 600 on a control board.

1.1.1 Wire Fill Factor

Furthermore and as shown in FIGS. 2A, 2B, and 8, the wire can define a rectangular cross-section, and adjacent linear and arcuate sections 540, 542 of the first coil segment 526A nest to form a compact coil with no or minimal gapping between these adjacent linear and arcuate sections 540, 542. Accordingly, the motor winding 501 can exhibit high (e.g., maximal) wire fill in interstices between adjacent linear and arcuate sections 540, 542 (e.g., compared to an inductor formed by a wire defining a round cross-section). Adjacent linear and arcuate sections 540, 542 of the second coil segment 526B can similarly nest.

Similarly, the innermost arcuate section 542 of the first coil segment 526A can define a bend radius approximating the minimum bend radius of the wire. Each other arcuate section 542 in the first coil segment 526A can define a bend radius greater than the subsequent arcuate section 542 by one-fourth of the thickness of the wire. Therefore, the first coil segment 526A can exhibit a maximum wire fill—limited by the minimum bend radius of the wire—within a rectangular volume bounded by the outermost linear and arcuate sections 540, 542 of first coil segment 526A. The second coil segment 526B can define a similar geometry and thus exhibit similar maximum wire fill.

Therefore, the first and second coil segments 526A, 526B can cooperate to define the motor winding 501 characterized by very high wire fill factor. A motor (or generator or other electric machine) constructed with instances of the motor winding 501 can therefore exhibit high spatial efficiency (e.g., large power or torque output per unit volume of the motor).

1.1.2 Motor Characteristics

Furthermore, a set of like motor windings 501 and stator poles 34—also defining rectangular interior cross-sections—can be installed over an annular core defining a rectangular cross-section to form a coil winding assembly 500. As shown in FIG. 1B, a rotor assembly—including interior radial, exterior radial, upper axial, and/or lower axial linear magnet arrays—can be installed around the coil winding assembly 500 to form a motor.

Because the motor windings 501 define rectangular cross-sections, the inner, outer, upper, and lower linear sections 540: are located near and parallel to their corresponding interior radial, exterior radial, upper axial, and/or lower axial linear magnet arrays; and thus exhibit high (e.g., maximal) magnetic coupling to their corresponding linear magnet arrays. For example, these linear sections 540 of the motor windings 501 can exhibit maximal magnetic coupling—to their corresponding linear magnet arrays—limited by a minimum gap between the rotor assembly and the coil winding assembly 500 necessitated by motor assembly and bearing tolerances.

Furthermore, the radial sections of the motor windings 501 are non-parallel to linear magnet arrays and therefore contribute less magnetic coupling per unit length to the linear magnet arrays than the linear sections 540. Therefore, because the radii of the innermost arcuate sections 542 of each motor winding 501 approximate the minimum bend radius of the wire and because the arcuate sections 542 of each motor winding 501 nest with minimal gaps, the outermost arcuate sections 542 of each motor winding 501 also exhibit minimum bend radii—and therefore minimum lengths—for the wire geometry and the quantity of turns in the motor windings 501.

Therefore, a motor assembled with instances of the motor winding 501 can exhibit high spatial efficiency and maximal magnetic flux between motor windings 501 and adjacent magnet arrays, as limited by: a minimum wire bend radius; and motor assembly and bearing tolerances.

1.2 Continuous Wire

The motor winding 501 includes a wire, such as a solid unitary conductive structure defining a rectangular wire cross-section, as shown in FIGS. 2A and 2B.

In one implementation, a solid, full-soft or half-soft, round copper wire is drawn through a set of rollers to form a solid, half-soft or full-hard, copper wire defining a rectangular wire cross-section. In this implementation, the round copper wire can be coated with a non-conductive elastic (e.g., polymer) coating, such as prior to or after reforming into the rectangular wire cross-section.

The coated rectangular wire is then formed around the mandrel assembly 600 as described below to form the continuous coil 526. In particular, a single, contiguous length of the wire can be wound about the mandrel assembly 600 to form the continuous coil 526 spanning the first terminal 536A, the length of the wire, the first coil segment 526A, the junction segment 526C, the second coil segment 526B, and the second terminal 536B.

The wire is described herein as defining a rectangular cross-section, which may maximize a fill of the wire within the motor winding 501. However, the wire can alternatively define a square, round, elliptical, or other geometry.

1.3 Continuous Coil Geometry

The coated rectangular wire (hereinafter "the wire") is then formed around the mandrel assembly 600 as described below to form the continuous coil 526. In particular, a single, contiguous length of the wire can be wound about the mandrel assembly 600—in a single, continuous direction—to form the continuous coil 526 spanning the first terminal 536A, the first coil segment 526A, the junction segment 526C, the second coil segment 526B, and the second terminal 536B.

1.3.1 Coil Sections

Once formed, the continuous coil 526 includes: the first terminal 536A; the first coil segment 526A extending from and contiguous with the first terminal 536A; the junction segment 526C extending from and contiguous with the first coil segment 526A; the second coil segment 526B extending from and contiguous with the junction segment 526C; and the second terminal 536B extending from and contiguous with the second coil segment 526B.

Once the continuous coil 526 is tensioned (i.e., twisted or "torqued") about its z-axis and compressed along its z-axis: curvilinear sections 540 of the first coil segment 526A align within a first plane; curvilinear sections 540 of the second coil segment 526B align within a second plane parallel to and offset from the first plane by approximately a width of the wire; and the junction segment 526C extends non-parallel to the first and second planes to connect the innermost curvilinear sections 540 of the first and second coil segments 526A, 526B. More specifically, in this tensioned configuration, the z-axis of each curvilinear section 540 of the first segment of the wire—spanning the first terminal 536A and the first coil segment 526A—can fall approximately on the first plane. Similarly, in this tensioned configuration, the z-axis of each curvilinear section 540 of the second segment of the wire—spanning the second terminal 536B and the second coil segment 526B—can fall approximately on the second plane. The first coil segment 526A thus defines a first multi-turn inductor segment spiraling in a first (e.g., clockwise) direction about the z-axis of the continuous coil 526. Similarly, the second coil segment 526B thus defines a second multi-turn inductor segment spiraling in the same first (e.g., clockwise) direction about the z-axis of the continuous coil 526. The junction segment 526C connects the innermost curvilinear sections 540 of the first and second coil segments 526A, 526B to yield a contiguous, two-layer multi-turn inductor defining a rectangular coil cross-section and formed of a single continuous wire defining a rectangular wire cross-section.

Furthermore, once transitioned into the tensioned configuration, the continuous coil 526 defines a rectangular orifice: coaxial with the coil axis; defined in part by the junction segment 526C; and configured to receive an annular core that defines a corresponding rectangular coil cross-section.

1.3.2 Turns

The first coil segment 526A, the junction segment 526C, and the second coil segment 526B can cooperate to form an even quantity or an odd quantity of turns.

Generally, the location of the junction segment 526C relative to the first and second terminals 536A, 536B and the z-axis of the continuous coil 526 controls the turn count of the continuous coil 526. In particular, the continuous coil 526 can define a rectangular coil cross-section including: a vertical coil axis (or "y-axis") perpendicular to and extending through the coil z-axis; and a horizontal coil axis (or "x-axis") perpendicular to and extending through the coil z-axis. The first terminal 536A extends from the first coil segment 526A parallel to the horizontal coil x-axis. The second terminal 536B similarly extends from the second coil segment 526B parallel to the horizontal coil x-axis and adjacent the first terminal 536A. To form an even quantity of turns in the continuous coil 526, the junction segment 526C is arranged between the vertical coil y-axis and the first terminal 536A. Conversely, to form an odd quantity of turns in the continuous coil 526, the junction segment 526C is arranged opposite the first terminal 536A from the vertical coil y-axis.

Furthermore, to form an even quantity of turns plus a half-turn in a clockwise-wound continuous coil 526, the junction segment 526C extends in a horizontal plane—parallel to the first and second terminals 536A, 536B—above the horizontal coil x-axis. Similarly, to form an odd quantity of turns plus a half-turn in a clockwise-wound continuous coil 526, the junction segment 526C extends in a horizontal plane—parallel to the first and second terminals 536A, 536B—below the horizontal coil x-axis.

1.3.3 Nested Linear and Arcuate Sections

Generally and as shown in FIG. 8, the first coil segment 526A includes linear sections 540 of common vertical and horizontal lengths connected via arcuate sections 542 that a common radial angle of 90° but that exhibit radii diminishing in stepped increments approximating (e.g., equal to) the thickness of the wire (and the coating) such that the linear and arcuate sections 540, 542 of the first coil segment 526A nest (i.e., fit compactly with minimal or no gaps) in the tensioned configuration.

For example, the first coil segment 526A can include: a set of vertical linear sections 540, each defining a common section height; a set of horizontal linear sections 540, each defining a common section length less than the common section height; and a set of arcuate sections 542 connecting the set of vertical linear sections 540 and the set of horizontal linear sections 540. In this implementation, each arcuate section 542 defines a common radial angle of 90° and is characterized by a bend radius: narrower than a preceding bend radius of a preceding arcuate section 542 by one-fourth of the wire (and coating) thickness; and wider than a succeeding bend radius of a succeeding arcuate section 542 by one-fourth of the wire (and coating) thickness.

Furthermore, an innermost arcuate section 542—in this set of arcuate sections 542—is connected to the junction segment 526C and is characterized by a last bend radius. Conversely, a first outermost arcuate section 542—in the set of arcuate sections 542—is connected to the first terminal 536A and defines a first bend radius greater than the last bend radius of the innermost arcuate segment. For example, the innermost arcuate section 542 can approximate a minimum bend radius of the wire, such as the wire (and coating) thickness for solid half-hard copper wire. Accordingly, the outermost arcuate segment can define a bend radius equal to a sum of: the last bend radius of the innermost arcuate segment; and the product of the wire (and coating) thickness and the total quantity of turns in the first coil segment 526A.

The second coil segment 526B can include a similar combination of horizontal, vertical, and arcuate segments defining similar geometries.

1.3.4 Junction Segment

As shown in FIGS. 2A and 2B, the junction segment 526C functions to connect the innermost arcuate segments of the first and second coil segments 526A, 526B. In the tensioned configuration, the junction segment 526C extends between the first and second planes centered between the first and second coil segments 526A, 526B, respectively.

Because the junction segment 526C extends between the offset first and second planes, the junction segment 526C is longer than the common length of the adjacent linear sections 540 of continuous coil 526. In one implementation, the first coil section defines a rectangular coil cross-section in the first plane. The rectangular coil cross-section defines: a vertical coil axis; and a horizontal coil axis. In this implementation, the first coil segment 526A includes: a set of vertical linear sections 540 extending parallel to the vertical coil axis, each defining a common section height; and a set of horizontal linear sections 540 extending parallel to the horizontal coil axis, each defining a common section length less than the common section height. In this implementation, the junction segment 526C defines a third length greater than the common section height and less than a sum of the common section height and the wire thickness. For example, the junction segment 526C can define a length approximating the square root of the sum of the square of the common section height and the square of the wire thickness.

Furthermore and as described below, the mandrel assembly 600 can define linear ramp sections 640 configured to form the vertical and horizontal linear sections 540 and the junction segment 526C. Accordingly, a linear ramp section 640—configured to form the junction segment 526C—can define a length greater than the lengths of the linear ramp sections 640 configured to form the vertical linear sections 540 of the first coil segment 526A.

Therefore, because the junction segment 526C is longer than the vertical linear sections 540 of the first and second coil segments 526A, 526B, twisting the continuous coil 526 into the tensioned configuration can locate the junction segment 526C in compression between the innermost arcuate sections 542 of the first and second coil segments 526A, 526B. The junction segment 526C can thus function to retain a vertical offset between the innermost arcuate sections 542 of the first and second coil segments 526A, 526B and tightly nest these innermost arcuate sections 542 into adjacent arcuate sections 542 of the first and second coil segments 526A, 526B.

1.3.5 Volumetric Efficiency

Therefore, the first and second coil segments 526A, 526B can each define linear and arcuate segments configured to nest tightly in the tensioned configuration. The junction segment 526C can retain the innermost arcuate sections 542 of the first and second coil segments 526A, 526B nested tightly against adjacent arcuate sections 542 in the first and second coil segments 526A, 526B, respectively, in the tensioned configuration.

Furthermore, in the tensioned configuration, the first coil segment 526A occupying the first plane and the second coil segment 526B occupying the second plane are compressed along the z-axis of the continuous coil 526 to: offset the first and second places by approximately the width of the wire; and thus reduce or eliminate any air gap between the first and second coil segments 526A, 526B.

Therefore, once the continuous coil 526 is twisted and compressed into the tensioned configuration and assembled on an annular core as described below, the total effective volume of the continuous coil 526 not occupied by the wire and the coating may be limited to two triangular sections: arranged on each side of the junction segment 526C; of thickness equal to the thickness of the wire; and extending between the junction segment 526C the opposing axial ends of the first and second coil segments 526A, 526B.

Thus, the continuous coil 526 can exhibit high spatial efficiency with a very limited proportion of its effective volume not occupied by inductor materials.

1.4 Pre-/Post-Tension Geometry

As described below, the wire is wound about a mandrel assembly 600 that includes: a first rectangular helical ramp section defining a pitch approximating width of wire and spiraling inwardly to form the first coil segment 526A; and a second rectangular helical ramp section spiraling outwardly to form the second coil segment 526B. In particular, the mandrel assembly 600 can include rectangular helical ramps that approximate a target final geometry of the continuous coil 526: once removed from the mandrel and twisted about the coil z-axis to align the first and second terminals 536A, 536B; and before the continuous coil 526 is compressed along the coil z-axis to align the first and second coil segments 526A, 526B into the first and second planes. However, upon removal from the mandrel assembly 600, the wire may enter a relaxed configuration due to spring back that is characteristic of formed metal, as shown in FIGS. 7B, 7C, 7D, 7E, and 7F.

More specifically, the mandrel assembly 600 can define a series of linear ramp sections 640 and interspersed between a series of 90° arcuate ramp sections 642. When the wire is wound about and tensioned across these ramp sections, the wire can form corresponding linear and 90° arcuate sections 542. However, when the wire is removed from the mandrel: the arcuate sections 542 of the wire may spring back to less than 90°; and the linear sections 540 of the wire may spring back to convex arcuate section 542 defining radii (much) greater than radii of the arcuate sections 542. Furthermore, though the first and second terminals 536A, 536B of the wire extend in parallel directions when wound on the mandrel assembly 600, the wire may open about the coil z-axis such that the first and second terminals 536A, 536B no longer extend in parallel directions.

Therefore, in the relaxed configuration following removal of the wire from a mandrel: the wire defines a segmented helical path about the coil z-axis; the first terminal 536A may be nonparallel to the second terminal 536B; the set of linear vertical sections of the wire may be nonparallel; and the set of linear horizontal sections of the wire may be similarly nonparallel.

To transition the wire into the tensioned configuration, the wire is tensioned (or "twisted," "torqued") about the coil z-axis to locate the first terminal 536A parallel to the second terminal 536B, thereby: returning the linear sections 540 to their linear profiles defined by the mandrel assembly 600; returning the arcuate sections 542 to 90° sweeps; and locating the set of vertical linear sections 540 perpendicular to the set of horizontal linear sections 540, as shown in FIG. 8.

The wire is further compressed (or "squeezed") parallel to the coil z-axis: to locate the linear and arcuate sections 540, 542 of the first coil segment 526A within the first plane; and to locate the linear and arcuate sections 540, 542 of the second coil segment 526B within the second plane. More specifically, to complete transition of the wire in the tensioned configuration, the first coil segment 526A is compressed against the second coil segment 526B parallel to the coil z-axis axis to: center the set of vertical linear, horizontal linear, and arcuate sections 542 of the first coil segment 526A within the first plane; and to center the set of vertical linear, horizontal linear, and arcuate sections 542 of the second coil segment 526B within the second plane.

Therefore, in the tensioned configuration: linear segments of the wire can return to linear profiles defined by the mandrel assembly 600; arcuate segments of the wire can return to arcuate 90° profiles defined by the mandrel assembly 600; the first coil segment 526A is aligned within the first plane to form a first inductor row spiraling inwardly in a first direction; the second coil segment 526B is aligned within the second plane to form a second inductor row immediately adjacent the first inductor row spiraling outwardly in the first direction; and the junction segment 526C extends between the first and second planes along the inside of the continuous coil 526 to connect the first and second coil segments 526A, 526B.

1.5 Potting

The motor winding 501 further includes a potting material 800 encasing the wire and retaining the wire in the tensioned configuration. More specifically, once the wire is removed from the mandrel assembly 600 and twisted and compressed into the tensioned configuration, the first and second coil segment 526B can be encased in the potting material 800 to retain the continuous coil 526 in the tensioned configuration and to complete the motor winding 501.

Figure 4:
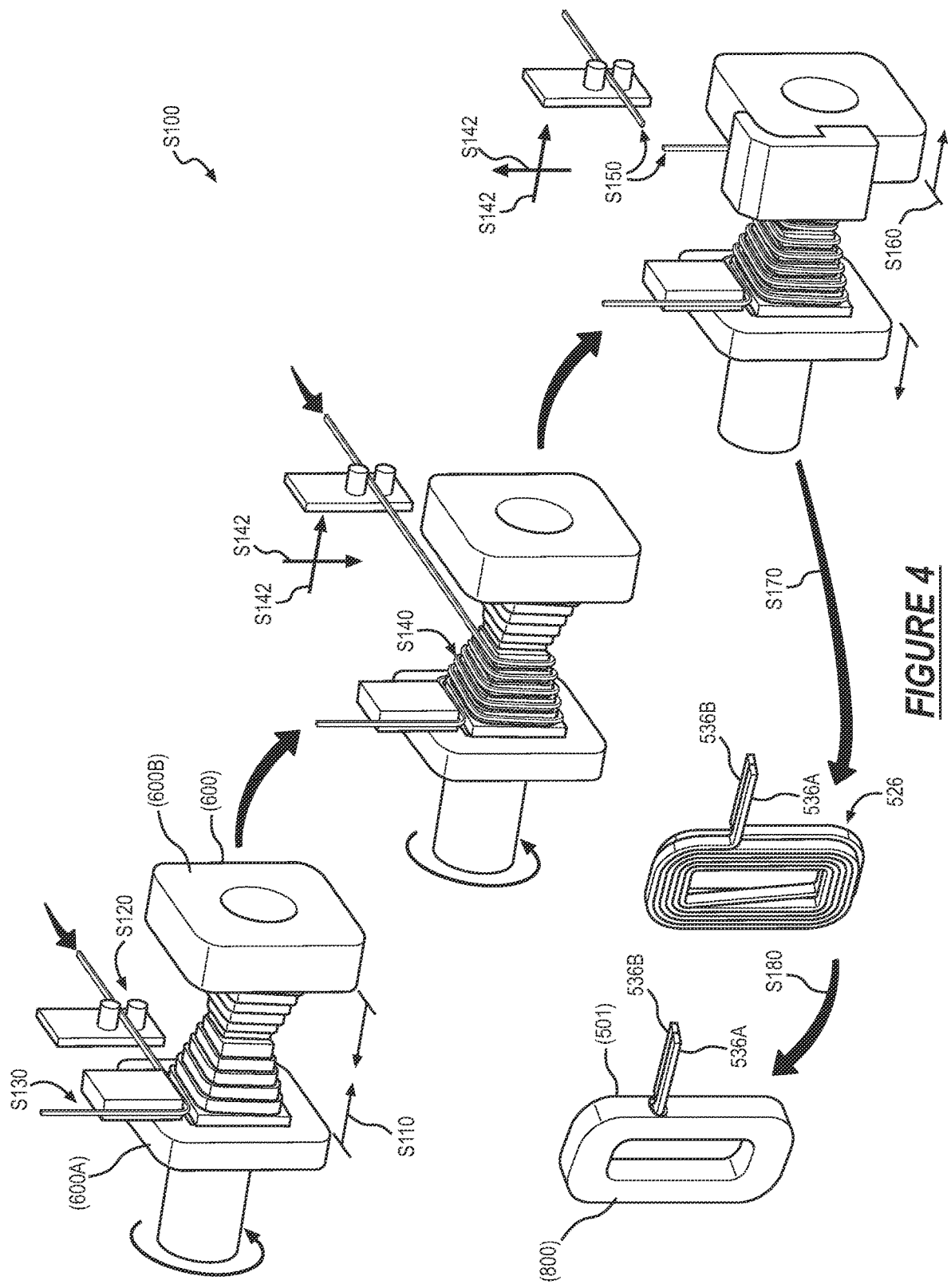
FIG. 4 is flowchart representation of one variation of the method.

For example, once the wire is transitioned into the tensioned configuration: the first and second terminals 536A, 536B can be retained; and the first and second coil segments 526A, 526B can be sprayed with or dipped in a thermoset plastic, silicone rubber gel, resin, or epoxy potting material, as shown in FIGS. 4 and 8.

Once the potting material 800 dries or cures, the encapsulated first and second terminals 536A, 536B can be released.

Once the motor winding 501 is installed on an annual core 42, the unencapsulated first and second terminals 536A, 536B can be connected (e.g., soldered) to a motor controller 1202 to: supply current to the motor winding 501; support the motor winding 501 and the annual core 42 within a motor housing; and to accurately locate the coil winding assembly 500 within the motor housing.

1.6 Variation: Segmented Wire

In one variation, the first and second coil segments 526A, 526B are formed separately on mandrel forms and then soldered, bonded, or otherwise connected across the junction segment 526C to complete the continuous coil 526.

For example, the first coil segment 526A can be wound on a first mandrel defining a first rectangular helical ramp section spiraling inwardly in the continuous angular direction about the coil axis; the second coil segment 526B can be wound on a second mandrel defining a second rectangular helical ramp section spiraling outwardly in the continuous angular direction about the coil axis; and the junction segment 526C can be assembled between the first coil segment 526A and the second coil segment 526B to form the continuous coil 526.

2. Method

Figure 5:
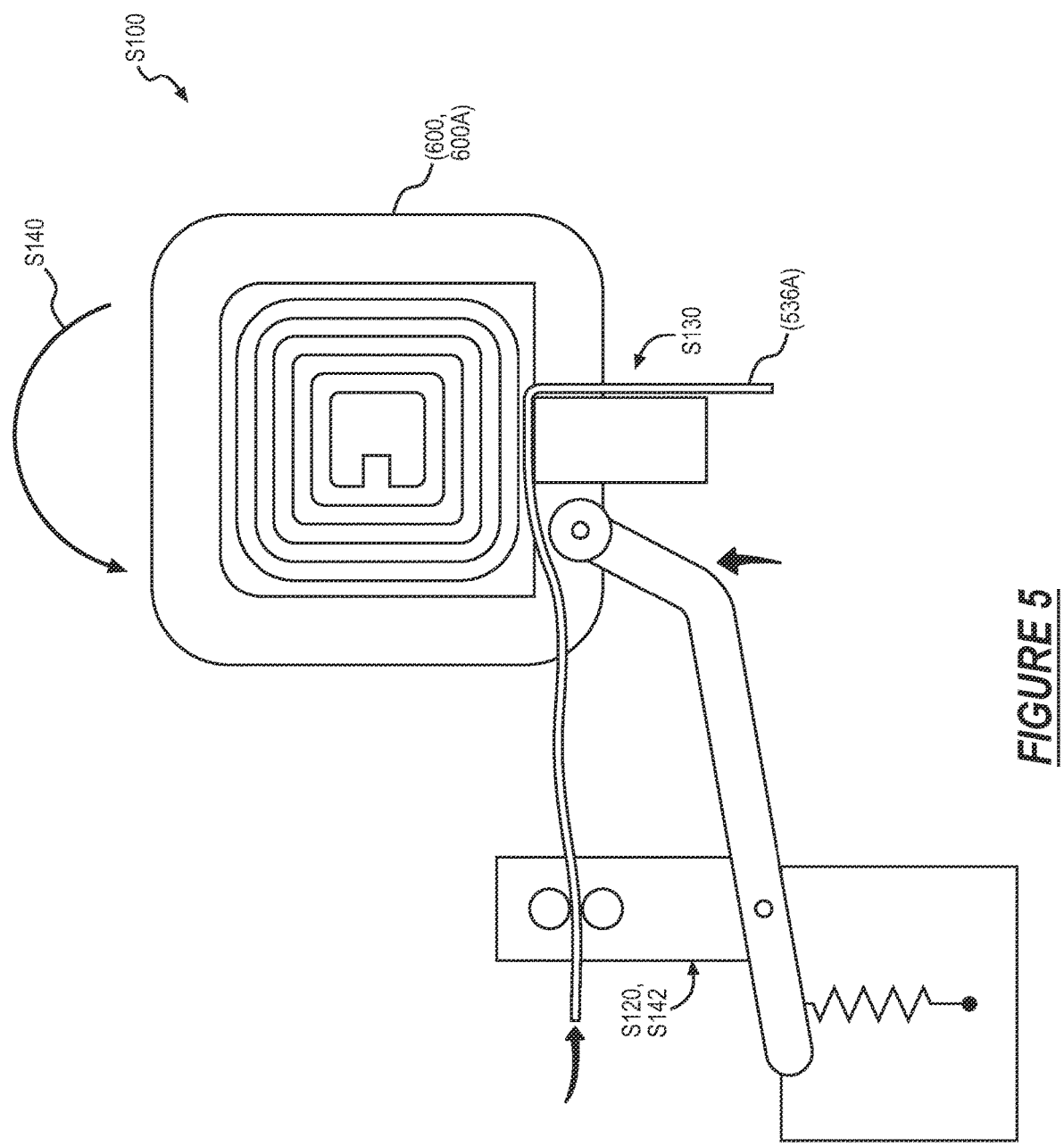
FIG. 5 is schematic representation of one variation of the method.

As shown in FIGS. 4 and 5, a method S100 for winding the continuous coil 526 includes assembling a first mandrel form 600A and a second mandrel form 600B in Block S110 to form a mandrel assembly 600 defining: a first rectangular helical ramp section defining a helical pitch and spiraling inwardly about a helical axis; and including a second rectangular helical ramp continuous with the first rectangular helical ramp, defining the helical pitch, and spiraling outwardly about the helical axis. The method S100 also includes: loading a wire into a wire feeder in Block S120, the wire defining a wire width approximating the helical pitch; and locating a first end of a wire on the mandrel assembly 600 proximal a start of the first rectangular helical ramp in Block S130, the first end of the wire defining a first terminal 536A.

The method S100 further includes, during a winding period: wrapping the wire about the first rectangular helical ramp section followed by the second rectangular helical ramp section in Block S140; and traversing the wire feeder, parallel to the helical axis, from proximal the start of the first rectangular helical ramp to proximal an end of the second rectangular helical ramp in Block S142.

The method S100 also includes: resecting the wire to form a second terminal 536B adjacent the first terminal 536A in Block S150; and separating the first mandrel form 600A from the second mandrel form 600B to release the wire from the mandrel assembly 600 in Block S160.

The method S100 further includes locating the wire in a tensioned configuration in Block S170 by: twisting the wire about a coil axis of the wire to align the first terminal 536A and the second terminal 536B; and compressing the wire parallel to the coil axis to a) locate a first length of the wire in a first plane and b) locate a second length of the wire in a second plane parallel and offset from the first plane.

Furthermore, the method S100 includes bonding the wire in the tensioned configuration in Block S180.

2.1 Mandrel Assembly

Generally, the mandrel assembly 600 includes a first mandrel form 600A and a second mandrel form 600B, as shown in FIGS. 3A and 3B.

The first mandrel form 600A defines a first rectangular helical ramp that spirals inwardly in a first direction, including a series of linear ramp sections 640 interposed between a series of arcuate ramp sections 642 that connect to form a helix. As shown in FIG. 3B, the first mandrel form 600A can also define a first terminal lead-in 612A, including: a linear lead-in section extending parallel to a mandrel x-axis and configured to define a geometry of the first terminal 536A; a linear retention section facing and offset from an outermost linear section 540 of the first rectangular helical ramp and extending from the linear lead-in section to the first arcuate section 542 of the first rectangular helical ramp; and an arcuate lead-in section connecting the linear lead-in section and the linear retention section.

The second mandrel form 600B similarly defines a second rectangular helical ramp that spirals outwardly in the first direction, including a series of linear ramp sections 640 interposed between a series of arcuate ramp sections 642 that connect to form a helix. As shown in FIG. 3B, the second mandrel form 600B can also include a second terminal lead-out form 612B, including: a linear lead-out section extending parallel to the linear lead-in section of the first mandrel form 600A and configured to define a geometry of the second terminal 536B; a linear retention section facing and offset from an outermost linear section 540 of the second rectangular helical ramp and extending from the linear lead-out section toward the last arcuate section 542 of the second rectangular helical ramp; and an arcuate lead-out section connecting the linear lead-out section and the linear retention section.

In one implementation shown in FIG. 4, the second terminal lead-out form 612B is removable from the second mandrel form 600B. In this implementation, the wire is continuously wound around the last linear ramp section 640 of the second mandrel form 600B, the second terminal lead-out form 612B is installed on the second mandrel form 600B, and the mandrel assembly 600 is wound in reverse to wrap the wire around the second terminal lead-out form 612B. In another implementation, the second terminal lead-out form 612B is retractable—parallel to the z-axis of the mandrel assembly 600—from the second mandrel form 600B. In this implementation, the second terminal lead-out form 612B is retracted on the second mandrel form 600B, the wire is continuously wound around the last linear ramp section 640 of the second mandrel form 600B, the second terminal lead-out form 612B is advanced on the second mandrel form 600B, and the mandrel assembly 600 is wound in reverse to wrap the wire around the second terminal lead-out form 612B.

When assembled, the first and second mandrel forms 600A, 600B can cooperate to define a continuous helical ramp that spirals inwardly from the first terminal lead-in 612A toward a mandrel junction and then spirals outwardly from the mandrel junction toward the second terminal lead-out form 612B. More specifically, the first and second mandrel forms 600A, 600B can be keyed together, keyed to a mandrel shaft, or otherwise configured to assemble and clock (or "key") together to form the continuous helical ramp between the linear lead-in and lead-out sections, as shown in FIG. 3A.

Furthermore, when the first and second mandrel forms 600A, 600B are assembled, the innermost linear ramp sections 640 of the first and second mandrel forms 600A, 600B can cooperate to define a continuous linear junction ramp section 644 configured to form the junction segment 526C of the wire. The first and second mandrel forms 600A, 600B can therefore be split—approximately perpendicular to the mandrel z-axis—through the linear junction ramp section 644. Because the junction segment 526C defines a narrowest section of the internal rectangular orifice of the continuous coil 526, separating the mandrel assembly 600 across the linear junction ramp section 644 can enable the first and second module forms to be removed from the first and second coil segments 526A, 526B once the wire is fully wound about the mandrel assembly 600.

2.2 Winding Machine

The mandrel assembly 600 is configured to load onto a winding machine. The winding machine includes an actuator (e.g., a motor and gearbox) configured to rotate the mandrel assembly 600.

The winding machine further includes: a wire feeder (e.g., an eyelet) configured to receive and pass the wire toward the mandrel assembly 600; and a feeder actuator configured to translate the wire feeder along the mandrel assembly 600 at a rate of one pitch width of the helical path of the mandrel assembly 600 (e.g., one width of the wire) per one rotation of the mandrel assembly 600. For example, the feeder actuator can include a lead screw coupled (e.g., geared) to the mandrel assembly 600 such that one rotation of the mandrel assembly 600 translates the wire feeder—parallel to the z-axis of the mandrel assembly 600—by a distance equal to one pitch width of the helical path of the mandrel assembly 600 (or one width of the wire).

2.2 Wire Loading and Winding

In one implementation shown in FIG. 4, the wire—defining a rectangular cross-section—is stored on a spool. In preparation for winding a continuous coil 526: the first and second mandrel forms 600A, 600B are assembled; the mandrel assembly 600 is loaded onto the winding machine; and the wire feeder is reset to face the linear lead-in section of the first mandrel form 600A.

A first end of the wire is then: fed through the wire feeder; and fed between the linear retention section and the first linear ramp section 640 of the first mandrel form 600A.

The winding machine then rotates the mandrel assembly 600 in a second, reverse direction—opposite the first direction of the first rectangular helical ramp—by approximately 90° to bend the first end of the wire around the arcuate lead-in section and onto the linear lead-in section of the first mandrel form 600A, thereby locking the first end of the wire onto the mandrel assembly 600.

The winding machine then rotates the mandrel assembly 600 in the first, forward direction by a quantity of turns equal to the total quantity of turns defined by the mandrel assembly 600. The feeder actuator concurrently translates the wire feeder along the z-axis of the mandrel assembly 600 to following a contact point between the wire—inbound from the wire feeder onto the mandrel assembly 600—and a nearest ramp section of the mandrel assembly 600.

Once the wire is wound around the last linear ramp section 640 of the second mandrel form 600B, the second terminal lead-out form 612B is installed or advanced on the second mandrel form 600B, and the mandrel assembly 600 is wound in reverse by approximately 90° to wrap the wire around the second terminal lead-out form 612B. The wire is then resected (or "cut") near the wire feeder to release the continuous coil 526 from the spool.

The second terminal lead-out form 612B is then removed from or retracted on the second mandrel form 600B, and the mandrel form is separated from the second mandrel form 600B to release the continuous coil 526.

2.3 Motor Winding Completion

As described above, the continuous coil 526 is then twisted and compressed into the tensioned configuration and potted to retain the continuous coil 526 in the tensioned configuration and thus complete the motor winding 501.

2.4 Spring Back Compensation

In one variation shown in FIG. 5, to compensate for spring back of the wire when released from the mandrel assembly 600: each linear ramp section 640 of the mandrel assembly 600 defines a concave scalloped profile characterized by a (much) larger radius than the adjacent arcuate ramp sections 642; and the arcuate ramp sections 642 are tangent to the linear ramp sections 640 and thus define angular sweeps greater than 90°. In this variation, the winding machine further includes a mandrel follower configured to depress the wire into the concave scalloped profiles of the linear ramp sections 640 and to form the wire around the arcuate ramp sections 642.

In this variation, the linear lead-in section, the linear retention section, and the arcuate lead-in section of the first terminal lead-in 612A can cooperate to define an angle less than 90°. The linear lead-out section, the linear retention section, and the arcuate lead-out section of the second terminal lead-out form 612B can similarly cooperate to define an angle less than 90°.

For example, the mandrel follower can include a rigid or roller follower sprung toward the mandrel assembly 600 along a follower axis perpendicular to and intersecting the z-axis of the mandrel assembly 600 at or just behind a contact point between the wire—inbound from the wire feeder onto the mandrel assembly 600—and the nearest ramp section of the mandrel assembly 600. The mandrel follower can also be mounted to the feeder actuator with the wire feeder and therefore: translate along the mandrel assembly 600 with the wire feeder; follow the contact point between the inbound wire and the nearest ramp section of the mandrel assembly 600; and depress the wire onto the ramp sections of the mandrel assembly 600.

Therefore, in this variation, the winding machine can over-form each linear and arcuate section 540, 542 of the continuous coil 526 on the mandrel assembly 600. Thus, when the continuous coil 526 is released from the mandrel assembly 600, the wire may spring back to a form more closely approximating straight linear sections 540 and 90° arcuate sections 542. Furthermore, the continuous coil 526 may be transitioned into the tensioned configuration with less torque applied to the first and second terminals 536A, 536B, thereby necessitating potting material 800 with less rigidity or retention capacity to retain the continuous coil 526 in the tensioned configuration.

3. Coil Winding Assembly

As shown in FIGS. 1G and 1H, the set of motor windings 501 can then be installed over an annual core 42—with many other motor windings 501 and a set of stator poles 34 in a motor winding 501—stator pole 34 pattern—to form a coil winding assembly 500. In particular, the continuous coil 526 is configured to install over an annular core between: a pair of stator poles 34; and a second motor winding 501 and a third motor winding 501 geometrically analogous to the (first) motor winding 501. The motor winding 501 thus cooperates with the pair of stator poles 34, the second motor winding 501, the third motor winding 501, and the annular core to define a coil winding assembly 500 within an electric motor.

In one implementation shown in FIG. 1F, the annual core 42 includes a split ferrous or iron ring defining a rectangular cross-section approximating the geometry of the rectangular orifice of the motor winding 501. The motor winding 501—and other like motor windings 501—defines a rectangular cuboid with three sets of parallel faces.

To fill triangular interstitial regions between adjacent motor windings 501 arranged on the annual core 42, each stator pole 34 defines a triangular (or trapezoidal) prism geometry with one (or two) set of parallel faces. For example, a set of annular ferrous elements-defining a common height, a common rectangular orifice configured to receive the annual core 42, and different widths—can be stacked form a stator pole 34 approximating a triangular (or trapezoidal) prism geometry. More specifically, the first continuous coil 526 can define a rectangular coil cross-section in a plane normal to the motor z-axis; and the stator pole 34 can define a trapezoidal cross-section in this plane.

Therefore, a first half of the motor windings 501 and a first half of the stator poles 34 can be arranged on a first half of the annual core 42. A second half of the motor windings 501 and a second half of the stator poles 34 can be arranged on a second half of the annual core 42. These semi-circular subassemblies can then be aligned about a common motor z-axis to complete the coil winding assembly 500.

3.1 Interconnect Board

The coil winding assembly 500 can then be installed over an interconnect board 1200.

In one implementation shown in FIG. 1B, the interconnect board 1200 includes a circular array of vias, including two adjacent vias per motor winding 501, each via aligned with a terminal of its corresponding motor winding 501. To assemble the coil winding assembly 500 onto the interconnect board 1200, the terminals of each motor winding 501 are inserted into and soldered to their corresponding vias on the interconnect board 1200. The interconnect board 1200: is rigidly mounted to a motor housing; and can further connect to a motor controller 1202 that selectively distributes current to groups of motor windings 501 in the coil winding assembly 500—via the interconnected board—to selectively magnetically couple the motor windings 501 to magnetic elements in a rotor assembly.

The terminals of the motor windings 501 thus: support the coil winding assembly 500 above the interconnect board 1200; longitudinally and radially locate the coil winding assembly 500 relative to the interconnect board 1200 within the motor; and translate torque—resulting from magnetic coupling to magnetic elements in the rotor assembly when the motor is operated—into the interconnect board 1200 and thus into the motor housing.

Alternatively, the first terminal 536A and the second terminal 536B of each motor winding 501 can couple directly to interconnects (e.g., vias) on the motor controller 1202 (rather than to a separate interconnect board 1200): to retain the continuous coil 526 in a longitudinal and radial position relative to the rotor; and to source electrical current to the continuous coils 526.

A rotor, motor housing, bearings, and other motor components can be assembled around the coil winding assembly 500 and the interconnect board 1200 and/or the motor controller 1202 to complete a motor 10.

4. Winding Machine

This patent application describes an efficient method for winding coils used in motors and generators. Specifically, this disclosure describes an winding machine and method for winding a heavy gauge toroidal coil of an electric machine, the method including: attaching a first mandrel form winding form to a spindle shaft of a winding machine, wherein the first mandrel form winding form has a shape of a spiral ramp; attaching a second mandrel form winding form to the first mandrel form winding form to form a mandrel assembly, wherein the second mandrel form winding form has a shape of a spiral ramp; winding a wire around the first mandrel form winding form to bend the wire into a shape of the first mandrel form until the wire reaches the start of the second mandrel form winding form to form a first coil part; winding a wire around the second winding form to bend the wire into a shape of the second mandrel form to form a second coil part.

These and other features, and advantages, will be more clearly understood from the following detailed description taken in conjunction with the accompanying drawings which illustrate a novel permanent magnetic rotating flux machine having manufacturing and operational advantages over conventional electric machines For example, the flux density of the disclosed electric machine is very high, and the number of poles can be increase without reducing the permanent magnetic force per pole enabling higher power densities.

Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry or mechanisms used to control the rotation of the various elements described herein are omitted, as such control circuits are within the skills of persons of ordinary skill in the relevant art.

When directions, such as upper, lower, top, bottom, clockwise, counterclockwise, are discussed in this disclosure, such directions are meant to only supply reference directions for the illustrated figures and for orientation of components in the figures. The directions should not be read to imply actual directions used in any resulting invention or actual use. Under no circumstances, should such directions be read to limit or impart any meaning into the claims.

4.1 Clarification of Terms

For the purposes of this application, "flux current" is defined as the rate of current flow through a given conductor cross-sectional area. In one implementation, described herein the source of the magnetic field can be a current flowing in individual coils of a motor winding 501. In other implementation, the source of the magnetic field can be a permanent magnet The magnetic field associated with the permanent magnetic can be visualized as including of a set of directional magnetic flux lines surrounding the permanent magnet. The magnetic flux lines, often denoted as <P, or <Ps, are conventionally taken as positively directed from a N pole to a S pole of the permanent magnet. The flux density, often written in bold type as B, in a sectional area A of the magnetic field surrounding the permanent magnet, is defined as the magnetic flux <P divided by the area A, and is a vector quantity.

For the purposes of this application permeability is a measure of the ability of a material to support the formation of magnetic field within the material. That is, permeability is the degree of magnetization that the material will obtain in response to an applied magnetic field.

For purposes of this application the term "back iron" can refer to iron or any ferrous-magnetic compound or alloy, such as stainless steel, any nickel or cobalt alloy, electrical steel, laminated steel, laminated silicon steel, or any laminated metal including laminated sheets of such material, or a sintered specialty magnetic powder. For the purposes of this application an "inductor" is defined as an electrical component that stores energy in a magnetic field when electric current flows through the inductor. Inductors normally consist of an insulated conducting wire wound into a coil around a core of ferromagnetic material like iron. The magnetizing field from the coil will induce magnetization in the ferromagnetic material thereby increasing the magnetic flux.

The high permeability of the ferromagnetic core significantly increases the inductance of the coil.

In one implementation, described herein the permeability of the ferromagnetic core can increase the inductance of the coil by a factor of about one thousand or more. The inductance of a circuit depends on the geometry of the current path and the magnetic permeability of nearby materials. For example, winding a copper wire into a coil increases the number of times the magnetic flux lines link the circuit thereby increasing the field and thus the inductance of the circuit For tile purposes of this application "slot fill factor" is the ratio of tile cross-section area occupied by copper wire inside the stator slot to the total amount of available space in the empty stator slot For the purposes of this application "slot opening" is the size of the gap between the electric machine poles. The larger tile opening, tile easier it is to insert the wire of the coil. However, a larger slot opening can have a negative impact on the flux path. In contrast, if the opening is too small, then the wire must be wound into the slots turn by turn. This increases the difficulty of inserting and compressing the wire and can reduce the maximum possible fill due to tile limited space for tooling, especially when slot liners are the primary means of insulation. In practice the minimum opening should be about 2 times the wire diameter, increasing to about 3-4 times the wire diameter for larger coil bundles.

For the purpose of this application "wire gauge" refers to the diameter of the coil wire. The diameter of coil wire influences design in two ways. One is total diameter, which has a direct impact on the slot fill factor. The other is actual conductor area, that is, the amount of total diameter that is conducting material and not insulation which has a direct impact on how much current can flow through the coil wire. One way to increase conductor area is to use larger or heavier gauges of coil wire to get proportionally more copper than insulation. However, as the wire size increases, it becomes stiffer and more difficult to wind. Stiffer wire is less likely to conform to the slot shape and to other wire in the slot. While using smaller gauge wire will improve the ease of winding it will also increase the ratio of insulation to conducting material. Smaller gauge wires can also result in more turns or parallel wires which increases the risk of wire damage during insertion. In one implementation, a heavier wire gauge with a smaller number of turns can be used to increase the slot fill factor.

In practice, the amount of material that will fit in a slot depends on the shape of the slot and the area and shape of the stator components. The goal in designing the slot shape is to maximize capacity for copper and other components while minimizing the impact on the magnetic flux and manufacturability. Most distributed coil stators with random winding use either flat bottom slots with squared or rounded corners, or rounded slots with a radius along the bottom which is similar to the shape of teardrop.

While, the flat bottom slot can appear to have a higher capacity, its corners can create manufacturing challenges. For example, if a slot liner is used to insulate the stack, it will seldom conform perfectly to the slot and fill in the corners, creating dead space. Even if the liners fit perfectly in the slots, round magnet wire will still not conform to the flat bottom and corners. This also happens in stacks with powder coating where the sharp corners typically lead to buildup of excess powder coating and create dead spaces in the slot that cannot be filled by the wire.

In one implementation, a rounded slot shape can be used when round magnet wire is used. Rounded bottom slot shapes resolve both problems. A rounded bottom slot provides a consistent surface for the slot liners to conform to and the radius can be optimized to allow the wire to fill in more space around the slot edges. Rounded slots can increase maximum slot fill by 5-10 percent when round magnet wire is used. In other implementation, a flat bottom slot can be used when rectangular magnet wire is used.

For the purpose of this application "coil bundle size" refers to the number of turns per coil and the number of wires in parallel in random coil windings, more turns and more wire in parallel leads to a large coil bundle with many wires crossing each other without a set pattern. This variation is difficult to anticipate in the design phase. One way to reduce wire crossover is to use precision wound coils that are either hand inserted or machine inserted. This can reduce wire crossover, but additional tooling/fixtures are required to place the wires precisely in the slots. Twisting and crossing wires during the winding and inserting process creates extra dead space between individual strands of wire which could result in a faulty coil winding. This twisting and crossing of wire also reduces the slot fill factor and can increase the difficulty of insertion. In addition, a large bundle coupled with a small slot opening will increase the difficulty of manufacturing as the wires can need to be passed through the slot one by one.

In one implementation, the wires can be passed through the slot one by one to prevent twisting and crossing of wires during the manufacturing process and increase the slot fill factor. In one implementation, both ends of the wire can be passed through the slot at substantially the same time during the manufacturing process.

For the purposes of this application "stack aspect ratio" is the relationship of stack length to outside diameter (OD). In general, if the stack length increases while the OD remains the same then the maximum possible slot fill factor will decrease while the difficulty of manufacturing will increase. That is, the higher the aspect ratio, the more difficult the manufacturing process becomes due to difficulty in compressing the wire in the middle of the stack length on longer parts as leverage is reduced. For example, a design with an aspect ratio of about 3.25 will be more difficult to manufacture than one with the same OD and an aspect ratio of 2.5, because of the effort required for insertion. In a conventional electric machine, slot fill percentages of about 80% or more can be possible if the aspect ratio is less than about 1.

For the purpose of this application, AWG means American Wire Gauge, which is a logarithmic standardized wire gauge for the diameter of round, solid, nonferrous, electrically conducting wire. The smaller the wire gauge, the larger the diameter in inches or millimeters, and vice versa.

For the purpose of this application, a Halbach array is a particular arrangement of permanent magnets having a spatially rotating pattern of magnetization that augments the magnetic field strength on one side of the array while decreasing the magnetic field strength on the other side of the array. In such an arrangement, the magnetic field strength can be almost doubled on an augmented side and near zero on a diminished side. Because the magnetic flux on the diminished side is substantially contained within the magnets of the array, a ferrous back-iron material may not be required.

4.2 System Overview

An electric motor will now be used as an example of an application for the proposed spiral ramp coil winding method for heavy gauge flay wire. Other applications for the disclosed spiral ramp coil winding method can include, but are not limited to, transformer windings where the proposed winding method can be used for the primary winding and/or secondary winding.

FIG. 1A isometric view illustrating one implementation of a Torque Tunnel Electric Motor (TTEM) 10. An alternate use of the same mechanical configuration is as a Torque Tunnel Electric Generator (TTEG) in which sequentially switching a load across the different windings is synchronized to rotation. In the following implementation the abbreviation TTEM 10 can therefore be extended to mean Torque Tunnel Electric Machine. In the implementation shown in FIG. 1A, the TTEM 10 can have a set of toroidal wound phase coils arranged circumferentially around a common stator core having uniform angular spacing. The set of phase coils being encompassed by an inner radial rotor, an outer radial rotor, and two axial rotors having purposely arranged permanent magnets.

FIG. 1B is an exploded isometric view of several components and subassemblies of the electric machine 10 of FIG. 1A showing their relative axial positions. Moving from left to right in FIG. 1B, are shown structural components of the TTEM 10, including a second axial rotor core 245, a spider stator outer 708B, a spider stator inner 708A, a second sealed bearing 704B, a second retaining ring 706B, a central shaft or axle 702, an outer rotor core 235, a first retaining ring 704A, a first sealed bearing 706A, an inner rotor core 215, and a first axial rotor core 215. The electric machine 10 can also include electrical/electromagnetic components. Moving from left to right in FIG. 1B are also shown electrical/electromagnetic components of the electric machine 10 including a brushless motor controller 1202, a PCB interconnect board 1200, and a coil winding assembly 500 surrounded by a quadruple-rotor assembly including a magnetic toroidal cylinder 100 having an inner rotor core 215, a first axial rotor core 225, an outer rotor core 235, and a second axial rotor core 245. These components are aligned about center z-axis 101 which is also the center of rotation of the electric machine 10.

In one implementation, the second axial rotor core 245, the outer rotor core, the inner rotor core 235, the first axial rotor core 225, and the inner rotor core 215 can be mechanically coupled and therefore rotate together. In one implementation, the inner rotor core 215 and the first axial rotor core 225 can be formed of a single casting. In one implementation, the combined inner rotor core 215 and the first axial rotor core 225 can be mutually coupled to the outer rotor core 235 and the second axial rotor core 245 by means of at least one mechanically fastener 238. In other implementation, some of these elements, and other elements, can be configured for independent rotation about the center shaft 702 and/or center z-axis 101.

In one implementation, the inner rotor assembly 210 can include a set of inner rotor axial permanent magnets 212 positioned about and coupled to an inner rotor core 215. The first axial rotor assembly 220 can include a set of first axial permanent magnets 222 positioned about and coupled to a first axial rotor core 225. The outer rotor assembly 230 can include a set of outer permeant magnets 232 positioned about and coupled to an outer rotor core 235. The second axial rotor assembly 240 can include a set of second axial rotor permanent magnets 242 positioned about and coupled to a second axial rotor core 245.

In one implementation, the permanent magnets 212, 222, 232, and 242 can form ideal or substantially ideal Halbach arrays. In other implementation, the permanent magnets 212, 222, 232, and 242 can form quasi-Halbach arrays, in which case the inner rotor core 214, first axial rotor core, outer rotor core 234, and second axial rotor core 244 can be constructed, at least in part, of a ferromagnetic back iron material. Furthermore, the segments of permanent magnets 212, 222, 232, and 242 are configured to increase the 3D magnetic flux field in the magnetic toroidal cylinder 100, such that the FDD is increased.

In one implementation, one or more of the rotor cores, 215, 225, 235, and 245 can be electric steel and form part of a back-iron circuit 804 of the electric machine 10, while also providing structural rigidity due to its high stiffness. In other implementation, including a set of Halbach arrays such heavy materials can not be needed for the rotor cores 215, 225, 235, and/or 245, although a material like Polyether Ether Ketone (PEEK), aluminum, carbon fiber etc. can be need for structural integrity. Implementation, of the electric machine 10 are also known as the Hunstable Electric Turbine (HET) or a circumferential flux four rotor electric machine.

In the implementation shown in FIG. 1B, the spider stator outer 708B, the spider stator inner 708A, the brushless motor controller 1202, the PCB interconnect board 1200, and the coil winding assembly 500 are mechanically coupled together to form a stator assembly that is fixed in place. The inner rotor core 215, first axial rotor core 225, the outer rotor core 235, the second axial rotor core 245, and magnetic toroidal cylinder 100 are coupled together to form the rotor assembly. Structural components, such as the bearings 704A and 704A, retaining rings 706A and 706B, spider stator inner 708A, and spider stator outer 708B, position and secure the rotor assembly about the center shaft 702.

In the implementation shown in FIG. 1B the coil winding assembly 500 is supported, at least in part, by the spider stator outer 708B extending from the coil winding assembly 500 through an inner slot defined by a first end of the inner rotor core 215 and an inner edge of the second axial rotor core 245.

4.3 Magnetic Toroidal Cylinder

FIG. 1C is a detailed isometric view of one implementation of the assembled magnetic toroidal cylinder 100 or magnetic disk of FIG. 1B. In the implementation illustrated in FIG. 1C, the magnetic toroidal cylinder 100 is centered about a longitudinal axis 101. In one implementation, the magnetic toroidal cylinder 100 can include a first axial magnetic wall 222 (not shown, also called a side wall or axial wall) and a second or opposing axial magnetic wall 242 positioned a predetermined distance from the first axial magnetic wall 222 along the longitudinal axis 101. An outer radial magnetic wall 232 and an inner radial magnetic wall 212 are generally longitudinally positioned between the first axial magnetic wall 222 and the second axial magnetic wall 242. Each of the magnetic walls 212, 222, 232, and 242 including a set of permanent magnets position with uniform angular spacing about, and coupled to, their respective rotor cores. The set of magnets can be made of permanent magnetic material, such as: Neodymium, Alnico alloys, ceramic permanent magnets, ferrite magnets, etc.

FIG. 1D is an isometric view of one implementation of a single Halbach array Torque Tunnel segment 150 which defines a portion of the magnetic toroidal cylinder 100 illustrated in FIG. 1C. Arrow 122 illustrates a circumferential direction with respect to the longitudinal axis 101 and arrow 124 illustrates a radial direction with respect to the longitudinal axis 101. Arrow 122 also indicates a relative circular path of motion of the rotor(s) of the electric machine 10.

For the particular magnetic tunnel segment 150, the magnetic pole(s) of the magnet(s) forming the outer radial magnet wall 232 and the inner radial magnetic wall 212 have their magnetic poles orientated generally in a radial direction, with respect to the longitudinal axis 101, as indicated by the arrow 124 of FIG. 1D. In contrast, the magnetic poles of the magnet(s) forming the first axial magnet wall 222 and the second axial magnet wall 242 have their magnetic poles orientated generally parallel to the longitudinal axis 101.

Thus, in the implementation shown in FIG. 1D, the individual magnets in the magnet walls 212, 222, 232, and 242 all have their "like magnetic poles" orientated towards the interior space 150 or away from an interior space 150. The term "like magnetic poles" used in this disclosure refers to a group of magnetic poles of either all north poles or all south poles. For example, the magnetic pole orientation or configuration within region a-d of FIG. 1D can generally be called a "SSSS" magnetic pole configuration, because all of the magnets forming the magnet walls 212, 222, 232, and 242 have their south poles facing inward. While the magnetic pole configuration within region e-h of FIG. 1D can generally be called a "NNNN" magnetic pole configuration, because all of the magnets forming the magnet walls 212, 222, 232, and 242 have their north poles facing inward. This arrangement of magnets directs flux from four or more directions into the continuous coils 526 of the coil winding assembly 500.

4.4 Coil Winding Assembly

When the electric machine 10 is assembled, a coil winding assembly 500 including a set of continuous coils 526 is concentrically positioned between the outer radial magnetic wall 232 and the inner radial magnet wall 212, and longitudinally positioned between the first axial magnet wall 222 and the second axial magnet wall 242 forming the magnetic toroidal cylinder 100. Each of the continuous coils 526 can be made from a conductive material wire, such as copper or a similar alloy. In one implementation, the winding can be a concentrated winding. That is, the number of poles is equal to the number of slots.

In one implementation each continuous coil 526 can include a single turn of conducting wire. In other implementation, each continuous coil 526 can include a set of turns of conductive wire. Furthermore, the conducting wire can have a rectangular shape cross section for a higher packing factor.

When the coil winding assembly 500 is energized, the current running through the coil windings 526 positioned within the portion of the magnetic tunnel segments 150 having a "NNNN" magnetic pole configuration can flow in an opposite direction than the current running through the coil windings positioned in the portion of the magnetic tunnel segment 150 having a "SSSS" magnetic pole configuration so that the direction of the generated magnetic force or torque is the same throughout the entire magnetic toroidal cylinder 100.

The windings of each continuous coil 526 are configured such that they are generally perpendicular to the direction of the relative movement of the magnets or rotor(s). More specifically, the continuous coils 526 are positioned such that their longitudinal sides are parallel with the longitudinal axis 101 and their ends or axial sides are radially perpendicular to the longitudinal axis 101. Thus, the continuous coils 526 are also transverse with respect to the magnetic flux produced by the individual magnets of the rotor at their interior face. Consequently, one of the advantages of this type of configuration over conventional electric motors is that the end turns of the continuous coils 526 are part of the "active section" or force generation section of the electric machine 10. In conventional electric motors, only the axial length of the coils produces power, the end turns of the coils do not produce power and merely add weight and copper losses. Therefore, for a given amount of copper more torque can be produced compared to a conventional electric motor.

4.5 Stator Poles

FIG. 1E is an isometric view of a coil module 30. Each coil module 30 can include a continuous coil 526 positioned between, and adjacent to, a pair stator poles 34 as illustrated. In one implementation, each of the stator poles 34 can include a first stator pole 34A and a second stator pole 34B formed of a soft magnetic material. As illustrated the cross-sectional shape of the stator pole 34 can be substantially trapezoidal being formed of in a staggered stacked arrangement of insulated magnetic steel laminations. This shape promotes even flux distribution at the pole faces of the stator pole 34 and within the first core section 42A.

Depending on the application the cross-sectional shape of the individual continuous coils 526 can be essentially cylindrical, square, or rectangular. A complete coil winding assembly 500 as illustrated in FIG. 1H can be formed by evenly distributing a set of coil modules 30 about the annular core 42.

4.6 Central Core or Yoke and Stator Poles

FIG. 1F is an isometric view of an annular core 42 (or "yoke") for the coil winding assembly 500. The annular core 42 can be made out of back iron material so that the annular core 42 will act as a magnetic flux force concentrator and distributes magnetic flux to each of the stator poles 34, or first and second stator poles 34A and 34B. In one implementation, the annular core 42 can be assembled from core segments that are coupled together. In the implementation shown in FIG. 1F the annular core 42 includes two first and second core sections 42A, 42B.

In one implementation, the annular core 42 can be made of pre-formed electrical steel laminations covered in a thin layer of epoxy adhesive or "structural adhesive" such as acrylic, cyanoacrylate, polyurethane, etc. This structure forces the magnetic flux to only flow within the plane of each magnetic steel lamination. In other implementation, the annular core 42 can be made from tape wound magnetic steel laminations using high-speed tape winding techniques. For example, the tape material can include magnetic tape back. Furthermore, the tape can have an electrically insulating (polyimide) coating, which prevents the magnetic flux from migrating from one lamination to the next.

FIG. 1G is an isometric view of the single Halbach array Torque Tunnel segment 150 of the magnetic toroidal cylinder 100 of FIG. 1D and associated stator poles 34 and continuous coils 526 of the coil winding assembly 500 positioned about a first core section 42A.

Referring once more to the implementation shown in FIG. 1A, FIG. 1A is an isometric view illustrating a novel electric permanent magnet electric machine 10 with high power density and high torque that utilizes up to four rotors assemblies 210, 220, 230, and 240 with a single coil winding assembly 500.

4.7 Background Coils and Coil Winding Methods

In general, current flowing through conductive wire wrapped around an iron core (stator) creates an electromagnetic field that either opposes or attracts the magnetic field produced by permanent magnets coupled to a rotor or drive shaft The interaction of the electromagnetic field with the field of the permanent magnets produces torque. The torque of the electric machine is based on, at least in part, the voltage applied to the conductive wire and therefore the current flowing through the wire, the density of the wire, the number of coils, and the number of coil windings. The electric machine's (motor's) maximum speed is determined, at least in part, by the amount of current flowing through the coils.

The stator does not move, but provides the force that drives the rotor(s). The stator is generally laminated to minimize eddy current losses in the form of heat and is divided into slots. During the manufacturing process insulated coils of conductive wire are inserted into the slots and arranged so that current flowing through them creates an electro-magnetic field. The size and number of slots determine, at least in part, how much wire can be contained in each coil, and the diameter/area of the wire determines, at least in part, how much current can pass through each coil Because stators are cylindrical, the slots can be wedge like in shape.

4.8 Challenge

One of the challenges facing an electric machine manufacture is how to maximize the amount or conductive wire inserted into each of the slots, commonly referred to as "slot fill factor", in order to maximize the torque output, without adversely affecting the manufacturability or the stator. While a 100·% slot fill factor would theoretically result in the maximum possible output torque for an electric machine, an electric machine having a 100% slot fill factor is impossible to build.

In practice, the fill factor is less than 100:1 because the insulation on the conductive wire reduces the percentage of the cross-sectional area that is conductive material, and round wire, which is the most commonly used shape in coil windings, leaves gaps between the conductive wires no matter how efficiently they are arranged. The effective slot fill factor can be reduced further because some of the available space can be used by insulating slot liners, wedges, phase separators (where two phases share the same slot), and the like" Therefore, with a conventional coil winding process only about 60-70% of the total slot fill tends to be conductive material, because achieving higher fill factors higher than 60-70°/o greatly increases the manufacturing complexity and the potential for quality issues. For example, obtaining a higher slot fill factor, greater than about 80%, without damaging either the conductive wire or its insulation can be difficult without slowing down the winding process and/or the use of specialized tools and fixtures.

Design parameters that affect the manufacturability of the required slot fill factor, include the stack aspect ratio, the size and shape of the slot opening, the coil bundle size, the wire gauge, the shape or the conductive wire, and the like. Coil winding and insertion techniques can also affect manufacturability and slot fill.

4.9 Double Back Coil Configuration

In one implementation, the disclosed spiral ramp coil-winding process can include a double-back coil configuration. A double-back coil uses half as many turns and the same number of wires in parallel but twice as many coils, which increases the overall length of the wound coil set This coil winding process includes inserting two coils back-to-back for each slot, which breaks down each coil into a more manageable halt size coil, while still inserting the same amount of conductive material per slot.

4.10 2-Coils-Make-1 Coil Configuration

In other implementation, the disclosed spiral ramp coil winding process can include a 2-coils-make-1 coil configuration. In the 2-coils-make-1 coil winding method each coil has half as many turns and wires in parallel but twice the total number of coil sets. One coil from each coil set is inserted at the same time. Once inserted the coil sets are Hien connected in parallel to achieve the same number of wires in parallel This is similar to the double-back winding process in that the coil bundle is half the size, but 2-coils-make-1 does not double the overall length of the coil.

4.11 Segmented Coil Winding Assembly

With the segmented coil winding assembly 500, the stator can be broken up into multiple individual segments based on the number of teeth in the design. These individual segments are then wound as a concentrated pole where the wire is either wound separately and installed to the tooth as disclosed in proposed spiral ramp coil winding process or the wire is wound directly onto the tooth without any interference from neighboring teeth. Once the teeth are wound, they can then be assembled to form the compete coil winding assembly 500. This method can provide a higher slot fill and speed up the manufacturing process, because the coil winding tooling can external to the stator and you do not need to have the wire pass through a slot opening. The difficulty with this type of assembly is the design of how the teeth coupled and stay together in order to ensure that electromagnetic path remains closed.

4.12 Conventional Coil Winding Process

The conventional method of winding a coil is to start the coil winding process at one end (side) and finish the coil winding process at the other end (side). This produces a space requirement for the beginning of the coil winding which takes space from the slot and the magnetic path, thereby reducing the slot fill factor. This conventional method of winding a coil also results in the terminations of the coil being displace from each other.

4.13 Spiral Ramp Coil-Winding Method for Flat Wires

This invention describes a spiral ramp coil-winding process for fly winding toroidal coils for coil winding assembly 500 and similar or analogous stators including transformers including multiple individual segments. In one implementation, the individual segments can be coupled together to form a complete stator assembly or transformer winding.

FIG. 2A is a right-side view of a single continuous coil 526 of the coil winding assembly 500 of FIG. 1H wound (clockwise) by the method described in this application. In the implementation shown in FIG. 2A the coil assembly has 9 turns including 4 first mandrel form turns in parallel with 4 second mandrel form turns with the ninth turn being formed by a partial turn on the first mandrel form and a partial turn of the right of the coil 56. This configuration ensures that the start of the continuous coil 526 and the end of the continuous coil 526 are adjacent to each other. In the implementation shown in FIG. 2A the two terminals 536A and 536B are in the same plane and are adjacent/parallel to each other.

FIG. 2B is a corresponding left isometric view of the continuous coil 526 of FIG. 2A.

In one implementation, at least one of the spiral wound continuous coils 526 may be formed from a flat rectangular conductive material having a cross-section with an aspect ratio of a first dimension to a second adjacent dimension, where the first dimension is longer than the second dimension. For example, the wire can be 15 AWG and the aspect ratio of the first dimension to the second dimension can be about 3:1. In another instance the wire can be 9.5 AWG and the aspect ratio of the first dimension to the second dimension can be about 1:1.

In one implementation, the method for making the spiral wound continuous coil 526 can include winding in a continuous and gradually tightening and/or widening curve a flat rectangular conductive material about an axis so as to form a cone. In one implementation the method for making a spiral wound continuous coil 526 can further include winding in a continuous and gradually tightening and/or widening curve a flat rectangular conductive material about a stepped mandrel 60(1 That is, moving the flat rectangular conductive material relative to a helical step 601 of the mandrel assembly 600 to create a stepped spiral continuous coil 526. In one implementation, the mandrel assembly 600 can have a shape of a stepped cone(s). In another implementation, the mandrel assembly 600 can have a shape of stepped rectangular pyramid(s), In another implementation, the spiral continuous coil 526 can include a first coil segment 526A in parallel with a second coil segment 526B, where the second coil segment 526B is connected to the first coil segment 526A via a junction segment 526C.

In yet another implementation, the spiral continuous coil 526 can include a substantially rectangular first coil segment 526A in parallel with a substantially rectangular second coil segment 526B, where the second first coil segment 526A is connected to the first coil segment 526A via a junction segment 526C.

In one implementation, the process of winding the heavy gauge continuous coils 526 of the coil winding assembly 500 can include, at least in part, a mandrel assembly 600 that contains the continuous coil 526 during the winding process. In one implementation, the mandrel assembly 600 can include provisions and fixtures for assisting with the bending and forming of the heavy gauge wire of the continuous coils 526 during the winding process.

FIG. 3A are isometric views of the first mandrel form 600A and the second mandrel form 600B of the mandrel assembly or mandrel assembly 600 of FIG. 3B before being coupled together.

FIG. 3B is an isometric view of a mandrel assembly 600 for clockwise coil winding after the first mandrel form 600A and the B-side 600B of the mandrel assembly 600 have been coupled together. Specifically, FIG. 3B is an an isometric view of a 9 turn clockwise coil-winding mandrel assembly 600. A second terminal lead-out form 612B is also illustrated in FIG. 3B. The second terminal lead-out form 612B is configured to maintain tension in the wire until the wire is bent up around the form and cut to length.

FIG. 3C is a mirrored isometric view of the clockwise mandrel assembly 600 of 3B after the first mandrel form 600A and the second mandrel form 600B have been coupled together. A first terminal lead-in form 612A coupled to the first mandrel form is also illustrated in FIG. 3B. The first terminal lead-in form 612A is configured to fix the conductive wire to the base of the first mandrel form 600A of the mandrel assembly 600. In some instances the first terminal lead-in form 612A is configured to fix the flat side of rectangular conductive wire to the base of the first mandrel form 600A of the mandrel assembly 600.

In one implementation, the first mandrel form 600A and the second mandrel form 600B of the clockwise mandrel assembly 600 can be paired together and fixed in a vice grip or lathe using a projection(s) and/or aperture formed in the first mandrel form and second mandrel form 600A. 600B of the mandrel assembly 600. In the implementation shown in FIG. 3A, the mandrel assembly 600 includes a projection 620A configured to insert and key into an aperture 620B of the second mandrel form 600B of the mandrel assembly 600.

Once the two halves 600A, 600B of the mandrel assembly 600 have been coupled the conductive wire can be installed on the mandrel assembly 600. In one implementation, the wire of the individual continuous coils 526 can be essentially cylindrical, square or even rectangular in cross-sectional shape. In one implementation the conductive wire can be copper. In other implementation conductive the wire can be aluminum or similar alloy. In the implementation shown in FIG. 1D, the cross-section shape of the wire is rectangular.

In one implementation, the wire can be pre-cut to length. For example, the wire can be pre-cut to the length required to complete 6, 7, 8 or the desired number of turns.

Figure 6A:
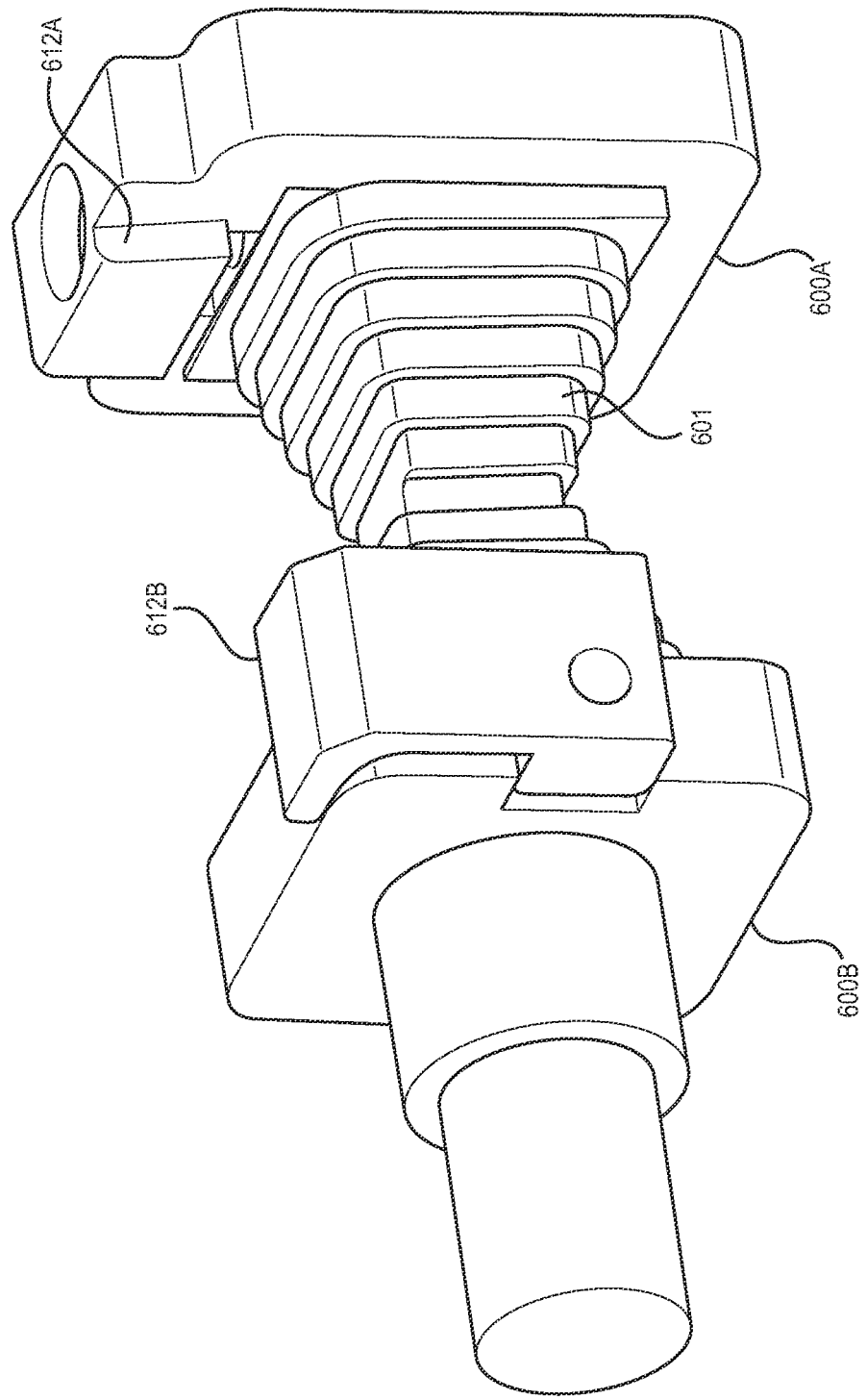
FIG. 6A is an isometric view of the mandrel assembly.

FIG. 6A is an isometric view of a mandrel assembly 600 for counterclockwise coil winding after the first mandrel form 600A and the second mandrel form 600B of the mandrel assembly 600 have been coupled together. Specifically, FIG. 6A is an isometric view of a 11-turn counterclockwise coil-winding mandrel. As illustrated the relative positions of the projection 620A, aperture 620B, first terminal lead-in form 612A, and Second terminal lead-out form 612B are flipped. That is, In the implementation shown in FIG. 6A the projection 620A and Lead-out form 612B are on the first mandrel form 600A and the aperture 620B and first terminal lead-in form 612A are on the second mandrel form 600B of the mandrel assembly 600.

FIG. 6B is more detailed isometric view illustrating the helical steps 601 of the counterclockwise mandrel assembly 600 of FIG. 6A.

FIG. 7A is an illustrated view of a clockwise wound continuous coil 526 on the mandrel assembly 600.

Figure 7B:
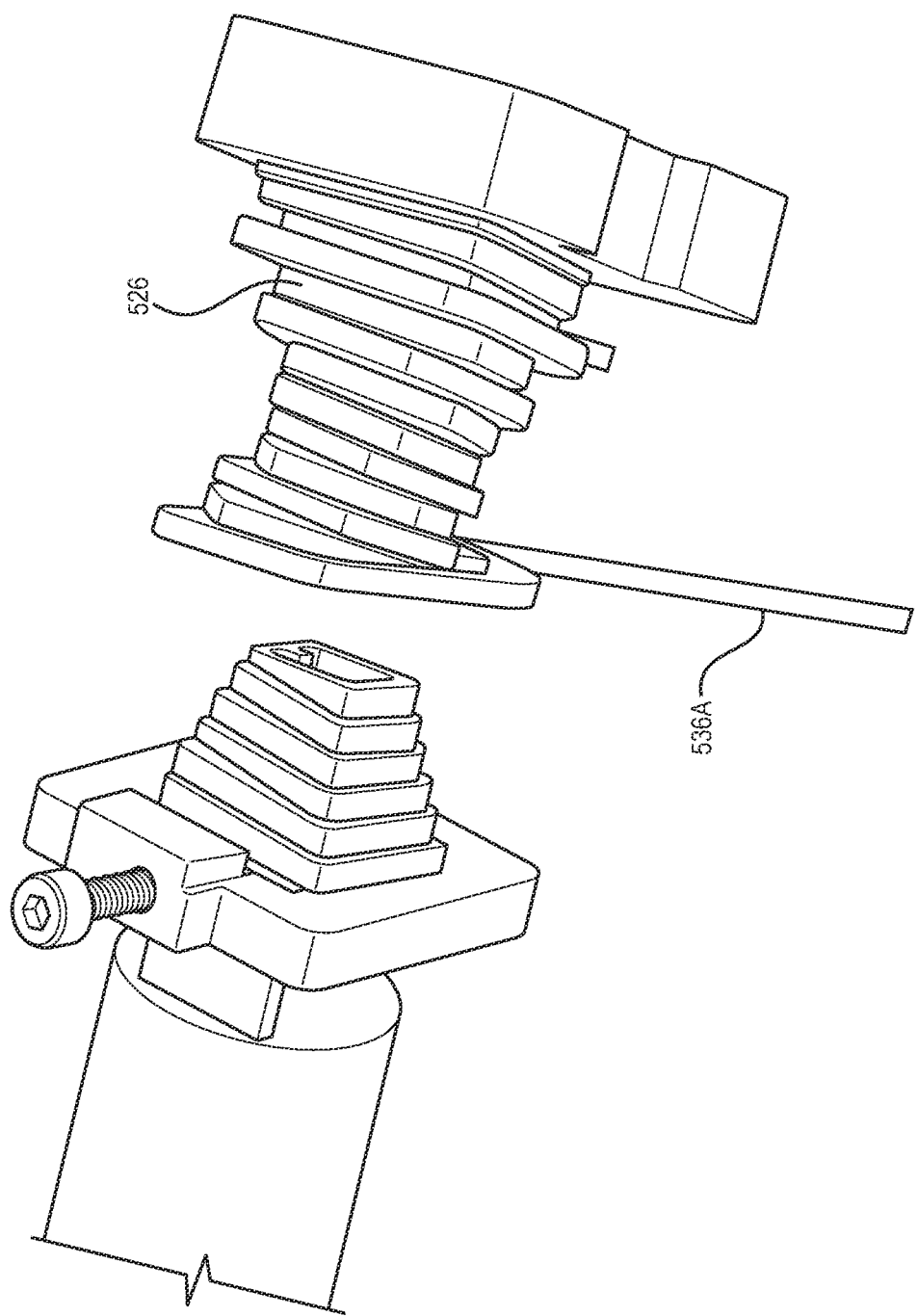

FIG. 7B is an illustrated view illustrating sprung-back of clockwise wound continuous coil 526 of FIG. 7A after being half detached from the mandrel assembly 600.

Figure 7C:
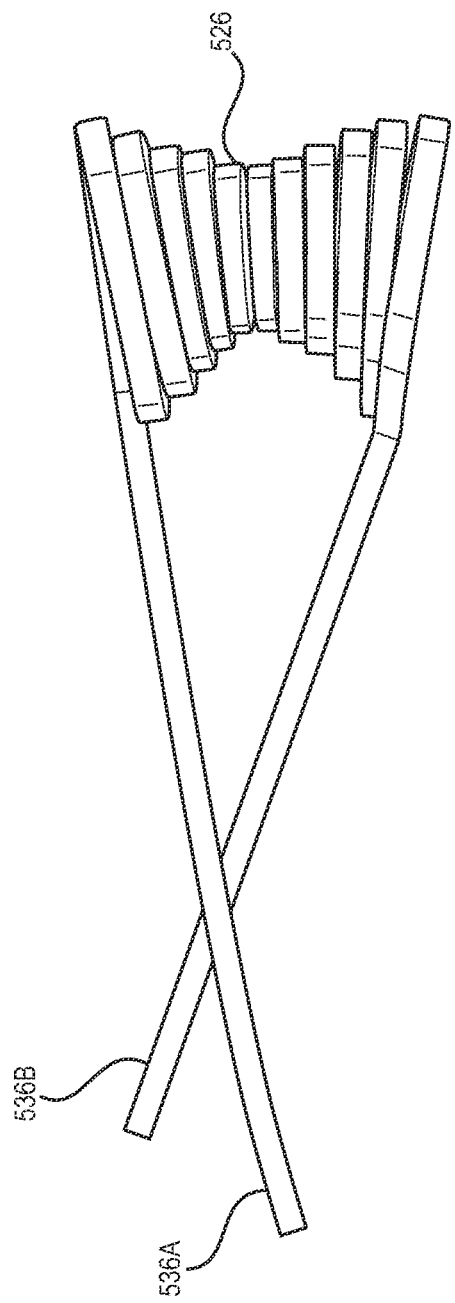

FIG. 7C is an illustrated view of a tensioned formed continuous coil 526 after being completely removed from the mandrel assembly 600.

Figure 7D:
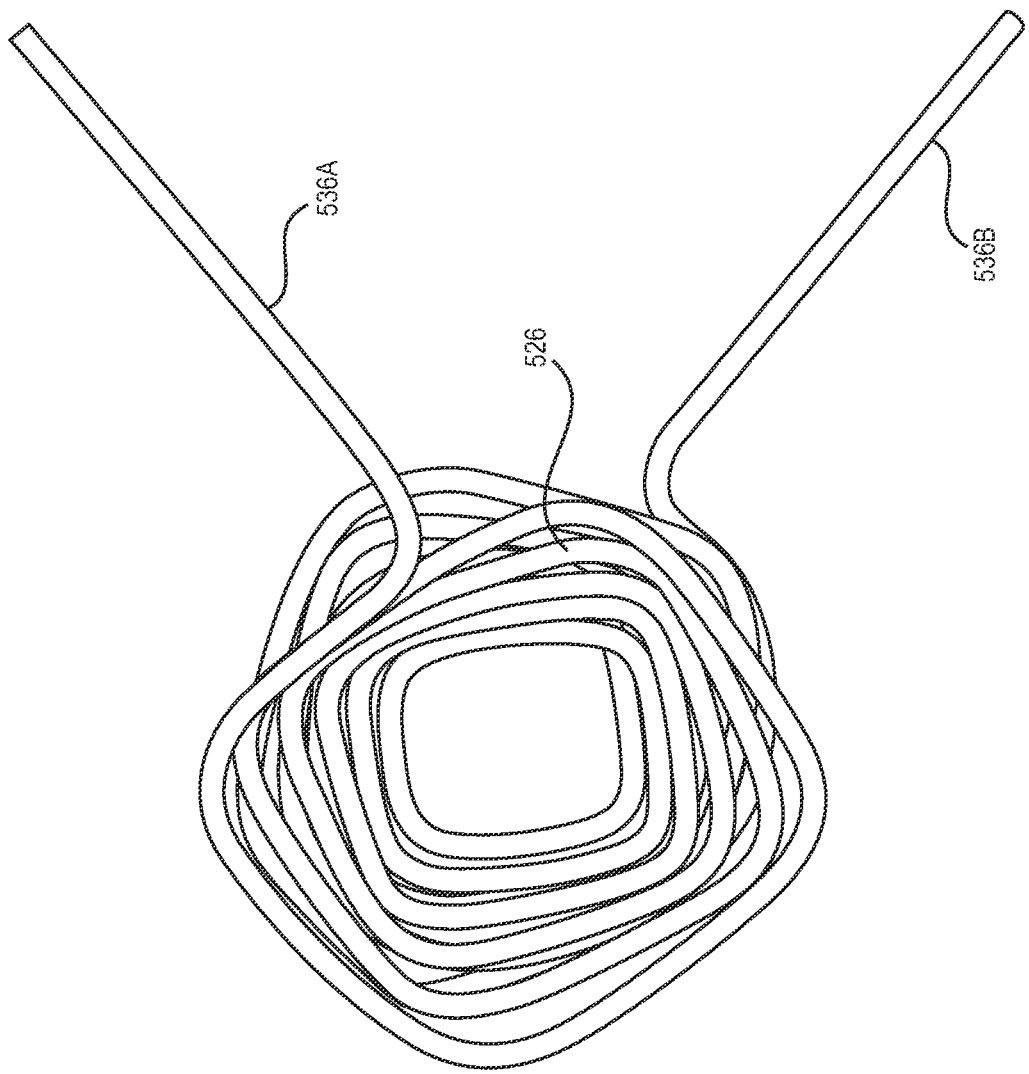

A FIG. 7D is a first illustrated top view of a tensioned formed counterclockwise-wound coil formed of cylindrical wire after being completely removed from the mandrel assembly.

FIG. 7E is a second illustrated side view of the tensioned formed counterclockwise-wound coil of FIG. 7D.

Figure 7F:
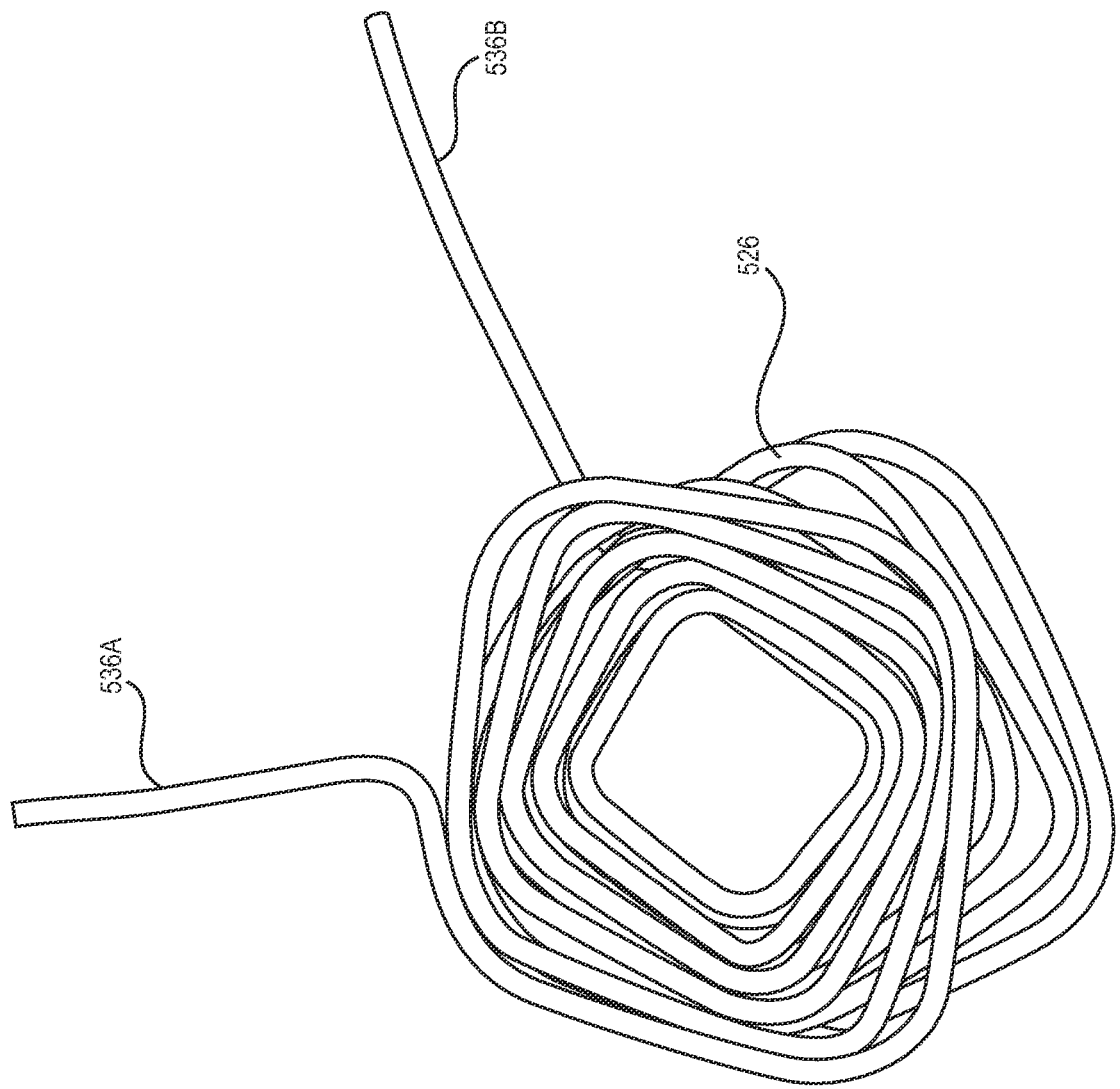

FIG. 7F is a third illustrated bottom view of the tensioned formed counterclockwise-wound coil of FIG. 7D.

Figure 7G:
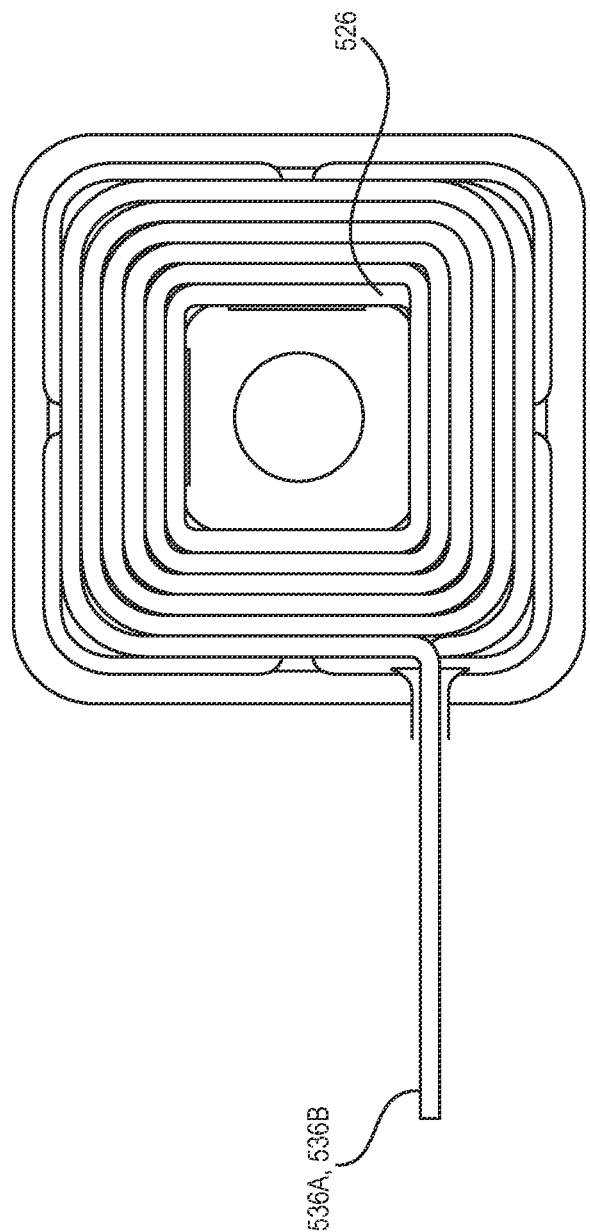
FIG. 7G is an illustrated view of the continuous coil in the tensioned continuous coil located in a potting die.

FIG. 7G is an illustrated view of the tensioned formed continuous coil 526 of FIG. 7C pressed into a potting die.

4.14 Step 1 of the Spiral Ramp Winding Process

In one implementation, step 1 of the spiral ramp winding process can include attaching a first mandrel form winding form 600A to a spindle shaft of a winding machine, wherein the first mandrel form winding form 600A has a shape of a spiral ramp.

In one implementation, step 1 of the spiral ramp winding process can also include attaching a second mandrel form winding form 600B to the first mandrel form winding form 600A, wherein the second mandrel form winding form 600B has a shape of a spiral ramp, and wherein the second mandrel form winding form 600B and the first mandrel form winding form 600B each include at least one portion 620A and 620B, respectively, of an alignment feature.

In one implementation, the alignment feature can include a notch 620B and key 620A as illustrated in FIG. 3A.

In another implementation, the first mandrel form winding form 600A can include a starting groove, to insures that the start point of the wire is placed in the correct location at the start of the winding process.

In one implementation, step 1 of the spiral ramp winding process can also include locking the second mandrel form winding form 600B to the first mandrel form winding form 600A using a tailstock assembly of the winding machine.

4.15 Step 2 of the Spiral Ramp Winding Process

In one implementation, step 2 of the spiral ramp winding process can include spooling wire via a tensioning pully to a fulcrum roller. In some instances, the wire can be insulated magnet rectangular copper wire.

In another implementation, step 2 of the spiral ramp winding process can further include pre-cutting the wire to a length determined by a desired number of coil-winding turns In one implementation, step 2 of the spiral ramp winding process can also include attaching with a first terminal lead-in form 612A the flat side of the insulated magnet rectangular copper wire to the base of the first mandrel form winding form 600A. In one implementation the width side of the rectangular wire is attached to the base of the first mandrel form winding form 600A. In another implementation the edge side of the rectangular wire is attached to the based of the first mandrel form winding form 600A.

4.16 Step 3 of the Spiral Ramp Winding Process

In one implementation, step 3 of the spiral ramp coil winding process can include extending the insulated magnet rectangular copper wire by a predetermined length and rotating the fulcrum roller around the first mandrel form winding form 600A or vice versa to bend the wire about 90 degrees. That is, a predetermined length of wire is sandwiched between the fulcrum roller rotating around the axis and a bender portion provided on the outer periphery of the mandrel assembly 600 formed by the first mandrel form winding form 600A. In certain instances, the first mandrel form winding form 600A can be 3D printed Acrylonitrile Butadiene Styrene (ABS) etc. In other instances, the first mandrel form winding form 600A can be formed from Polyether Ether Ketone (PEEK), which is a colorless organic thermoplastic polymer material, or a glass-reinforced thermoplastic.

In one implementation, the spiral ramp coil winding process can further include repeating step 3 of the spiral ramp winding process until a first number of turns is complete and the wire reaches the start of the second mandrel form winding form 600B. The second mandrel form winding form 600B can also be 3D printed ABS, PEEK, etc. In one implementation, the rectangular wire is sequentially bent in a width direction and wound axially. In another implementation, the wire is sequentially bent in an edgewise direction and wound axially.

In one implementation, tension can be maintained in the wire during the spiral ramp winding process with the fulcrum roller until the wire is cut to the required length.

4.17 Step 4 of the Spiral Ramp Winding Process

In one implementation, step 4 of the spiral ramp winding process can include extending the wire by a predetermined length and rotating the fulcrum roller around the second mandrel form winding form 600B or vice versa to bend the wire about 90 degrees. And repeating step 4 of the the spiral ramp winding process until a second number of turns is completed and the wire reaches the base of the second mandrel form winding form 600B.

In one implementation, the mandrel assembly 600 can include a crossover grove for connecting the first side of the continuous coil 526A to the second side of the continuous coil 526B. The crossover grove ensures that the halfway point of the wire is placed in the correct position at the start of the winding process for the second side 526B of the continuous coil 526. In one implementation, the crossover grove can be inclined at an angle with respect to the side walls of the mandrel assembly 600. In one implementation, the grove can be formed by the coupling of the first mandrel form 600A and second mandrel form 600B of the mandrel assembly 600. In some instances, the crossover grove can about the width of the cross-section of the rectangular wire.

In one implementation, the wire can be bent at an angle greater then 90 degrees to compensate for spring back. In another implementation the wire can be pre-formed or pre-bent prior to the start of the winding process to compensate for spring back. That is, the wire is bent a number of degrees beyond the desired angle of bend so that the wire springs back to the desired angle of bend.

4.18 Step 5 of the Spiral Ramp Winding Process

In one implementation, step 5 of the spiral ramp winding process can include extending and cutting the wire to a required length.

In one implementation, the spiral ramp winding process can include forming the first coil segment 526A by winding in a first direction and forming the second coil segment 526B by further winding in the first direction. In some instances, the first direction can be clockwise. In other instances, the first direction can be counterclockwise.

In some instances, the spiral ramp winding process can include forming the first coil segment 526A by winding in a first direction and forming the second coil segment 526B by winding in a second direction. In some instances, the first direction can be clockwise and the second direction is counterclockwise or vice versa.

In one implementation, the mandrel assembly 600 can include a chamfer or a transitional edge between adjoining right-angled faces of each helical step 601. Sometimes the chamfer can be defined as a form of bevel. In one implementation, the angle of chamfer between two adjoining right-angled faces can be about 45°. In other implementation the transition between adjoining right-angle faces can be about a quarter round.

4.19 Completing an Even Number of Turns

If the coil winding 526 is terminated in the same position as the beginning turn after a complete turn, then number of turns will be even because the winding is double. That is, the total number of turns will be 2N, where N is the number of compete turns counted from the first bend.

4.20 Competing an Odd Number of Turns

In contrast, if the coil winding is terminated in the same position as the beginning turn after a half-turn, then the number of turns will be odd. The number of complete turns is N2 plus a half turn on the first mandrel form of the mandrel assembly 600 and another half turn on the B-side of the mandrel assembly 600 making an odd number of turns in total. That is, the total number of turns competed will 2N+1. In practice the mandrel assembly 600 can be designed for any number of turns, and irrespective of whether the number of coil turns is even or odd the terminals 536A, 536B of each continuous coil 526 coil will be adjected to each other using the disclosed spiral ramp coil winding process.

In one implementation, the terminals 536A, 536B of each continuous coil 526 can be connected to a bus bar. In another implementation the terminals 536A, 536B can be connected to a Printed Circuit Board (PCB) interconnect board 1200, designed to fit within the central interior space of the coil winding assembly 500.

In one implementation, the individual continuous coils 526 can be connected in series without end terminations. In other implementation, a three-phase winding can be used where adjacent continuous coils 526 are connected together to form a branch of each phase. For example, two adjacent continuous coils 526 can be phase A coils, the next two adjacent continuous coils 526 can be phase B coils, and the next two adjacent continuous coils 526 can be phase C coils. This three-phase configuration would then repeat for all individual continuous coils 526 within the coil winding assembly 500. When the continuous coils 526 are energized, the three-phase winding can produce a rotating magnetic field in the air gap around the coil winding assembly 500. The rotating magnetic field interacts with the magnetic field generated by the toroidal magnetic tunnel producing torque and relative movement between the coil winding assembly 500 and the toroidal magnetic tunnel 100.

4.21 Advantages

One advantage of the proposed spiral coil winding method is that it does not require space for the beginning of the coil, which would otherwise take space from the slot and from the magnetic path reducing the slot fill factor.

Another advantage of the proposed spiral ramp coil winding method is that it can be performed by a single winding device. That is, the coil structure does not require forming two independent coils and connecting them together via a connection or linkage.

Another advantage of the proposed spiral ramp coil winding method is that first terminal 536A and the second terminal 536B are adjacent to each other.

Yet another advantage of the proposed spiral ramp coil winding method is that coil having adjacent start and end terminations can be wound without having to start in the middle of the coil and simultaneously winding both ends.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A motor winding comprising:
   a wire:
      defining a wire width along a primary wire axis;
      defining a wire thickness along a secondary wire axis, the wire thickness less than the wire width; and
      wound in a continuous angular direction about a coil axis to form a continuous coil comprising:
         a first terminal;
         a second terminal adjacent the first terminal;
         a first coil segment:
            comprising a first length of the wire spiraling in a first plane parallel to the secondary wire axis and perpendicular to the primary wire axis of the first length of the wire;

defining a first exterior coil end coupled to the first terminal; and defining a first interior coil end inset from the first exterior coil end and arranged on a first side of the coil axis;

a second coil segment:
comprising a second length of the wire spiraling in a second plane parallel to the secondary wire axis and perpendicular to the primary wire axis of the second length of the wire, the second plane parallel and offset from the first plane;

defining a second exterior coil end coupled to the second terminal; and defining a second interior coil end:
inset from the second exterior coil end; and
arranged on a second side of the coil axis opposite the first interior coil end; and a junction segment:
comprising a third length of the wire extending between the first plane and the second plane to couple the first interior coil end of the first coil segment to the second interior coil end of the second coil segment.

2. The motor winding of claim 1:
wherein the wire comprises a solid unitary conductive structure;
wherein the second length of the wire is contiguous with the first length of the wire; and
further comprising a non-conductive coating encasing the wire.

3. The motor winding of claim 1, wherein the continuous coil:
defines a rectangular orifice:
coaxial with the coil axis; and
configured to receive an annular core defining a rectangular core cross-section;
is configured to install over the annular core between:
a pair of stator poles; and
a second continuous coil and a third continuous coil geometrically analogous to the continuous coil; and
cooperates with the pair of stator poles, the second continuous coil, the third continuous coil, and the annular core to define a coil winding assembly within an electric motor.

4. The motor winding of claim 3, wherein the first terminal and the second terminal are configured to couple directly to interconnects on a motor control board:
to retain the continuous coil in a longitudinal and radial position relative to a motor rotor; and
to source electrical current to the first continuous coil.

5. The motor winding of claim 1:
wherein the first coil segment comprises:
a set of vertical linear sections, each vertical linear section in the set of vertical linear sections defining a common section height;
a set of horizontal linear sections, each horizontal linear section in the set of horizontal linear sections defining a common section length less than the common section height; and
a set of arcuate sections connecting the set of vertical linear sections and the set of horizontal linear sections, each arcuate section in the set of arcuate sections defining a common radial angle of 90°;
wherein an innermost arcuate section, in the set of arcuate sections, is connected to the junction segment and defines a last bend radius approximating a minimum bend radius of the wire; and wherein an outermost arcuate section, in the set of arcuate sections and connected to the first terminal, defines a first bend radius greater than the last bend radius.

6. The motor winding of claim 1:
wherein the first coil segment defines a rectangular coil cross-section in the first plane, the rectangular coil cross-section defining:
a vertical coil axis; and
a horizontal coil axis;
wherein the first coil segment comprises:
a set of vertical linear sections extending parallel to the vertical coil axis, each vertical linear section in the set of vertical linear sections defining a common section height; and
a set of horizontal linear sections extending parallel to the horizontal coil axis, each horizontal linear section in the set of horizontal linear sections defining a common section length less than the common section height; and
wherein the junction segment defines the third length greater than the common section height and less than a sum of the common section height and the wire thickness.

7. The motor winding of claim 6, wherein the first coil segment further comprises:
a set of arcuate sections connecting the set of vertical linear sections and the set of horizontal linear sections, each arcuate section in the set of arcuate sections:
defining a common radial angle of 90°; and
characterized by a bend radius:
narrower than a preceding bend radius of a preceding arcuate section, in the set of arcuate sections along the first length of the wire, by one-fourth of the wire thickness; and
wider than a succeeding bend radius of a succeeding arcuate section, in the set of arcuate sections along the first length of the wire, by one-fourth of the wire thickness.

8. The motor winding of claim 1:
wherein the first coil segment comprises:
a set of vertical linear sections; and
a set of horizontal linear sections;
wherein, in a relaxed configuration following removal of the wire from a mandrel:
the wire defines a segmented helical path about the coil axis;
the second terminal is nonparallel to the first terminal; and
the set of linear vertical sections are nonparallel; and
wherein, in a tensioned configuration of the wire:
the wire is tensioned about the coil axis:
to locate the second terminal adjacent and parallel to the first terminal; and
to locate the set of vertical linear sections perpendicular to the set of horizontal linear sections; and
the first coil segment is compressed against the second coil segment parallel to the coil axis to:
center the set of vertical linear sections and the set of horizontal linear sections of the first coil segment within the first plane; and
center the second coil segment within the second plane.

9. The motor winding of claim 8, wherein the wire:
is wound about the mandrel comprising:
a first rectangular helical ramp section defining a pitch approximating the width of the wire and spiraling inwardly to form the first coil segment; and a second rectangular helical ramp section spiraling outwardly to form the second coil segment; and
enters the relaxed configuration when removed from the mandrel.

10. The motor winding of claim 8, further comprising a potting material encasing the wire and retaining the wire in the tensioned configuration.

11. The motor winding of claim 1, wherein the first coil segment comprises the first length of the wire spiraling in the first plane offset from the second plane by the wire width.

12. The motor winding of claim 1, wherein the wire:
comprises a solid unitary conductive structure; and
defines a rectangular wire cross-section.

13. The motor winding of claim 1, wherein the wire:
is arranged adjacent and radially offset from a second motor winding 501 in a motor coil assembly, the second motor winding 501 comprising a second wire:
wound in the continuous angular direction about a second coil axis to form a second coil section comprising:
a third terminal;
a fourth terminal adjacent the third terminal;
a third coil segment;
comprising a fourth length of the second wire;
defining a third exterior coil end coupled to the third terminal; and
defining a third interior coil end inset from the third exterior coil end;
a fourth coil segment:
comprising a fifth length of the second wire;
defining a fourth exterior coil end coupled to the fourth terminal; and
defining a fourth interior coil end inset from the fourth exterior coil end; and
a second junction segment comprising a sixth length of the second wire coupling the third interior coil end of the third coil segment to the fourth interior coil end of the fourth coil segment; and
is angularly separated from the second motor winding by a stator pole.

14. The motor winding of claim 1:
wherein the first coil segment is wound on a first mandrel defining a first rectangular helical ramp section spiraling inwardly in the continuous angular direction about the coil axis;
wherein the second coil segment is wound on a second mandrel defining a second rectangular helical ramp section spiraling outwardly in the continuous angular direction about the coil axis; and
wherein the junction segment is assembled between the first coil segment and the second coil segment to form the continuous coil.

15. The motor winding of claim 1:
wherein the continuous coil defines a rectangular coil cross-section comprising:
a vertical coil axis perpendicular to and extending through the coil axis; and
a horizontal coil axis perpendicular to and extending through the coil axis;
wherein the first terminal extends from the first coil segment parallel to the horizontal coil axis;
wherein the second terminal extends from the second coil segment parallel to the horizontal coil axis and adjacent the first terminal;
wherein the junction segment is arranged between the vertical coil axis and the first terminal; and wherein the first coil segment, the second coil segment, and the junction segment cooperate to define an even quantity of coil turns.

16. A motor coil assembly comprising:
an annual core defining a motor axis;
a first continuous coil:
arranged on the annual core;
comprising a first wire:
defining a wire width along a primary wire axis; and
defining a wire thickness along a secondary wire axis, the first wire thickness less than the first wire width; and
wound in a continuous angular direction about a coil axis to form:
a first terminal;
a second terminal adjacent the first terminal;
a first coil segment:
comprising a first length of the first wire spiraling in a first plane parallel to the secondary wire axis and perpendicular to the primary wire axis of the first length of the first wire;
defining a first exterior coil end coupled to the first terminal; and
defining a first interior coil end inset from the first exterior coil end and arranged on a first side of the coil axis;
a second coil segment:
comprising a second length of the first wire spiraling in a second plane parallel to the secondary wire axis and perpendicular to the primary wire axis of the second length of the first wire, the second plane parallel and offset from the first plane;
defining a second exterior coil end coupled to the second terminal; and
defining a second interior coil end:
inset from the second exterior coil end; and
arranged on a second side of the coil axis opposite the first interior coil end; and
a junction segment:
comprising a third length of the first wire extending between the first plane and the second plane to couple the first interior coil end of the first coil segment to the second interior coil end of the second coil segment;
a second continuous coil:
arranged on the annual core; and
radially offset from the first continuous coil; and
a stator pole:
arranged on the annual core; and
interposed between the first continuous coil and the second continuous coil.

17. The motor coil assembly of claim 16:
wherein the first continuous coil defines a rectangular coil cross-section in a third plane normal to the motor axis; and
wherein the stator pole defines a trapezoidal cross-section in the third plane.

18. The motor winding of claim 16:
wherein the first wire comprises a solid unitary conductive structure;
wherein the second length of the first wire is contiguous with the first length of the first wire; and
further comprising a non-conductive coating encasing the first wire.

19. A method comprising:
assembling a first mandrel form and a second mandrel form to form a mandrel assembly defining:
  a first rectangular helical ramp section defining a helical pitch and spiraling inwardly about a helical axis; and
  comprising a second rectangular helical ramp continuous with the first rectangular helical ramp, defining the helical pitch, and spiraling outwardly about the helical axis;
loading a wire into a wire feeder, the wire defining a wire width approximating the helical pitch;
locating a first end of a wire on the mandrel assembly proximal a start of the first rectangular helical ramp, the first end of the wire defining a first terminal;
during a winding period:
  wrapping the wire about the first rectangular helical ramp section followed by the second rectangular helical ramp section; and
  traversing the wire feeder, parallel to the helical axis, from proximal the start of the first rectangular helical ramp to proximal an end of the second rectangular helical ramp;
resecting the wire to form a second terminal adjacent the first terminal;
separating the first mandrel form from the second mandrel form to release the wire from the mandrel assembly;
locating the wire in a tensioned configuration by:
  twisting the wire about a coil axis of the wire to align the first terminal and the second terminal;
  compressing the wire parallel to the coil axis to:
    locate a first length of the wire in a first plane; and
    locate a second length of the wire in a second plane parallel and offset from the first plane; and
bonding the wire in the tensioned configuration.

20. The method of claim 19:
wherein assembling the first mandrel form and the second mandrel form to form the mandrel assembly comprises assembling the mandrel assembly defining:
  a set of concave scalloped ramp segments interposed between a set of convex radial ramp segments along the first rectangular helical ramp section, the set of concave scalloped ramp segments defining radii greater than radii of the set of convex radial ramp segments; and
further comprising, during the winding period:
  depressing the wire into scalloped regions of the set of concave scalloped ramp segments.

* * * * *